US006828550B2

(12) United States Patent
Griffey et al.

(10) Patent No.: US 6,828,550 B2
(45) Date of Patent: Dec. 7, 2004

(54) EXTERNAL SHUTTER FOR ELECTROSPRAY IONIZATION MASS SPECTROMETRY

(75) Inventors: Richard Griffey, Vista, CA (US); Steven Hofstadler, Oceanside, CA (US)

(73) Assignee: ISIS Pharmaceuticals, Inc., Carlsbad, CA (US)

( * ) Notice: Subject to any disclaimer, the term of this patent is extended or adjusted under 35 U.S.C. 154(b) by 0 days.

(21) Appl. No.: 10/459,791

(22) Filed: Jun. 12, 2003

(65) Prior Publication Data

US 2004/0007666 A1 Jan. 15, 2004

Related U.S. Application Data

(63) Continuation of application No. 09/332,685, filed on Jun. 14, 1999, now abandoned.

(51) Int. Cl.[7] .............................................. B01D 59/44
(52) U.S. Cl. ....................... 250/281; 250/287; 250/288; 250/292
(58) Field of Search .......................... 250/281, 287–292

(56) References Cited

U.S. PATENT DOCUMENTS

| | | | | | |
|---|---|---|---|---|---|
| 4,238,678 | A | * | 12/1980 | Castleman et al. | 250/381 |
| 5,436,446 | A | * | 7/1995 | Jarrell et al. | 250/288 |
| 5,545,304 | A | * | 8/1996 | Smith et al. | 204/603 |
| 5,616,918 | A | | 4/1997 | Oishi et al. | |
| 5,811,800 | A | * | 9/1998 | Franzen et al. | 250/287 |
| 6,124,592 | A | * | 9/2000 | Spangler | 250/287 |

FOREIGN PATENT DOCUMENTS

| | | | | |
|---|---|---|---|---|
| DE | 3226803 | * | 7/1982 | H01J/49/04 |

OTHER PUBLICATIONS

Amster, "Fourier Transform Mass Spectrometry", *J. Mass Spectrom.,* 1996, 31, 1325–1337.

Anderegg et al., "Mass Spectrometric Characterization of a Protein—Ligand Interaction", *J. Am. Chem. Soc.,* 1995, 117, 1374–1377.

Baca et al., "Direct Observation of a Ternary Complex between the Dimeric Enzyme HIV–1 Protease and a Substrate–Based Inhibitor", *J. Am. Chem. Soc.,* 1992, 114, 3992–3993.

Baczynskyj et al., "Application of Thermally Assisted Electrospray Ionization Mass Spectrometry for Detection of Noncovalent Complexes of Bovine Serum Albumin with Growth Hormone Releasing Factor and Other Biologically Active Peptides", *Rapid Commun. Mass Spectrom.,* 1994, 8, 280–286.

Bayer et al., "Analysis of Double–Stranded Oligonucleotides by Electrospray Mass Spectrometry", *Anal. Chem.,* 1994, 66, 3858–3863.

(List continued on next page.)

*Primary Examiner*—Nikita Wells
*Assistant Examiner*—Zia R. Hashmi
(74) *Attorney, Agent, or Firm*—Wilmer Cutler; Pickering Hale and Dorr LLP

(57) ABSTRACT

Novel methods and apparatuses for mass spectrometry are disclosed wherein a time slice of ions are selectively accumulated in an ion reservoir of a mass spectrometer and subsequently are allowed to undergo an ion-molecule reaction with a reactive species or are dissociated with coherent radiation prior to mass analysis. These methods and apparatuses are amenable to mass spectrometric analysis of singly or multiply charaged ions of peptides, proteins, carbohydrates, oligonucleotides, nucleic acids and small molecules as prepared by combinatorial or classical medicinal chemistry.

48 Claims, 12 Drawing Sheets

OTHER PUBLICATIONS

Biemann, K., "Mass Spectrometry of Peptides and Proteins," *Ann. Rev. Biochem.,* 1992, 61, 977–1010.
Bowers, M.T. et al., "Mass Spectrometry: Recent Advances and Future Directions," *J. Phys. Chem.,* 1996, 100, 12897–12910.
Brodbelt, "Analytical Applications of Ion–Molecule Reactions," *Mass Spectrometry Rev.,* 1997, 16, 91–110.
Bruins et al., "Ion Spray Interface for Combined Liquid Chromatography/Atmospheric Pressure Ionization Mass Spectrometry", *Anal. Chem.,* 1987, 59, 2642–2646.
Burlingame, A.L. et al., "Mass Spectrometry," *Anal. Chem.,* 1998, 70, 647R–716R.
Busman et al., "Observation of Large Multimers in the Electrospray Ionization Mass Spectrometry of Peptides", *Rapid Commun. Mass Spectrom.,* 1994, 8, 211–216.
Cai et al., "Capillary electrohoresis—mass spectrometry", *J. Chromatogr.,* 1995, 703, 667–692.
Cheng et al., "Using Electrospray Ionization FTICR Mass Spectrometry to Study Competitive Binding of Inhibitors to Carbonic Anhydrase", *J. Am. Chem. Soc.,* 1995, 117, 8859–8860.
Cheng et al., "Direct Measurement of oligonucleotide binding stoichiometry of gene V protein by mass spectrometry", *Proc. Natl. Acad. Sci. USA,* 1996, 93, 7022–7027.
Cheng et al., "Electrospray Ionization with High Performance Fourier Transform Ion Cyclotron Resonance Mass Spectrometry for the Study of Noncovalent Biomolecular Complexes", in *Techniques in Protein Chemistry,* 1996, vol. 7, 13–21.
Cohen et al., "Probing the solution structure of the DNA–binding protein Max by a combination of proteolysis and mass spectrometry", *Protein Sci.,* 1995, 4, 1088–1099.
Colorado, A. et al., "Use of Infrared Multiphoton Photodissociation with Swift for Electrospray Ionization and Laser Desorption Applications in a Quadrupole Ion Trap Mass Spectrometer," *Anal. Chem.,* 1996, 68, 4033–4043.
Cooks, R.G. et al., "Mass Spectrometry: Exact Weights of Atoms, Molecules, and Molecular Fragments," *Accounts of Chem. Res.,* Nov. 1994, 27(11), 315.
Crain et al., "Applications of mass spectrometry to the characterization of oligonucleotides and nucleic acids", *Curr. Opin. Bioetechnol.,* 1998, 9, 25–34.
D'Agostino et al., "Analysis of bioactive peptides by liquid chromatography–high–resolution electrospray mass spectrometry," *J. Chrom. A,* 1997, 767, 77–85.
Doctycz et al., "Accumulation and Storage of Ionized Duplex DNA Molecules in a Quadrupole Ion Trap", *Anal. Chem.,* 1994, 66, 3416–3422.
Feng et al., "Analysis of Antibodies and Other Large Glycoproteins in the Mass Range of 150 000–200 000 Da by Electrospray Ionization Mass Spectrometry", *Anal. Chem.,* 1992, 64, 2090–2095.
Fitzgerald, M. et al., "Probing the oligomeric structure of an enzyme by electrospray ionization time–of–flight mass spectrometry", *Proc. Natl. Acad. Sci. USA,* 1996, 93, 6851–6856.
Gale et al., "Characterization of Noncovalent Complexes Formed between Minor Groove Binding Molecules and Duplex DNA by Electrospray Ionization—Mass Spectrometry", *J. Am. Soc. Mass Spectrometry,* 1995, 6, 1154–1164.
Gale et al., "Observation of Duplex DNA–Drug Noncovalent Complexes by Electrospray Ionization Mass Spectrometry", *J. Am. Chem. Soc.,* 1994, 116, 6027–6028.
Ganem et al., "Detecting Noncovalent Complexes of Biological Macromolecules: New Applications of Ion–Spray Mass Spectrometry", *ChemTracts–Org. Chem.,* 1993, 6, 1–22.
Ganem et al., "Detection of Oligonucleotide Duplex Forms by Ion–Spray Mass Spectrometry", *Tetra. Lett.,* 1993, 34(9), 1445–1448.
Ganguly et al., "Studies of the Ras–GDP and Ras–GTP Noncovalent Complexes by Electrospray Mass Spectrometry", *Tetrahedron,* 1993, 49(36), 7985–7996.
Gao et al., "Screening Derivatized Peptide Libraries for Tight Binding Inhibitors to Carbonic Anhydrase II by Electrospray Ionization–Mass Spectrometry", *J. Med. Chem.,* 1996, 39, 1949–1955.
Gautheir, J.W. et al., "Sustained off–resonance irradiation for collision–activated dissociation involving fourier transform mass spectrometry. Collision–activated dissociation technique that emulates infrared multiphoton dissociation," *Analytica Chimica Acta,* 1991, 246, 211–225.
Glover et al., "Sequencing of Oligonucleotides Using High Performance Liquid Chromatography and Electrospray Mass Spectrometry", *Rapid Commun. Mass Spectrom.,* 1995, 9, 897–901.
Goodlett et al., "Direct Observation of a DNA Quadruplex by Electrospray Ionization Mass Spectrometry", *Biol. Mass Spectrom.,* 1993, 22, 181–183.
Greig et al., "Measurement of Macromolecular Binding Using Electrospray Mass Spectrometry. Determination of Dissocation Constants for Oligonucleotide—Serum Albumin Complexes", *J. Am. Chem. Soc.,* 1995, 117, 10765–10766.
Griffey et al., "Detection of base pair mismatches in duplex DNA and RNA oligonucleotides using electrospray mass spectrometry", *Proc. SPIE–Int. Soc. Opt. Eng.,* 1997, 2985, 82–86.
Guan et al., "High performance detection of biomolecules using a high magnetic field electrospray ionization source/Fourier transform ion cyclotron resonance mass spectometer," *Rev. Sci. Instrum.,* 1995, 66(9), 4507–4515.
Hannis et al., "Nanoelectrospray Mass Spectrometry Using Non–Metalized, Tapered (50–10 $\mu$m) Fused–silica Capillaries," *Mass Spectrom.,* 1998, 12, 443–448.
Li et al., "Mass Spectrometric Studies on Noncovalent Dimers of Leucine Zipper Peptides", *J. Am. Chem. Soc.,* 1993, 115, 8409–8413.
Light–Wahl et al., "Observation of a Small Oligonucleotide Suplex by Electrospray Ionization Mass Spectrometry", *J. Am. Chem. Soc.,* 1993, 115, 803–804.
Light–Wahl et al., "Observation of the Noncovalent Quaternary Associations of Proteins by Electrospray Ionization Mass Spectrometry", *J. Am. Chem. Soc.,* 1994, 116, 5271–5278.
Light–Wahl et al., "Collisionally Activated Dissociation and Tandem Mass Spectrometry of Intact Hemoglobin β–Chain Variant Proteins with Electrospray Ionization", *Biol. Mass Spectrom.,* 1993, 22, 112–120.
Lim et al., "Recognition of Cell–wall Peptide Ligands by Vancomycin Group Antibiotics: Studies Using Ion Spray Mass Spectrometry", *J. Mass Spectrom.,* 1995, 30, 708–714.
Little et al., "Rapid Sequencing of Oligonucleotides by High–Resolution Mass Spectrometry", *J. Am. Chem. Soc.,* 1994, 116, 4893–4897.

Little et al., "Sequencing 50–mer DNAs Using Electrospray Tandem Mass Spectrometry and Complementary Fragmentation Methods", *J. Am. Chem. Soc.,* 1995, 117, 6783–6784.

Little et al., "Infrared Multiphoton Dissociation of Large Multiply Charged Ions for Biomolecule Sequencing", *Anal. Chem.,* 1994, 66, 2809–2815.

Little et al., "Verification of 50– to 100–mer DNA and RNA sequences with high–resolution mass spectrometry", *Proc. Natl. Acad. Sci. USA,* 1995, 92, 2318–2322.

Loo, J.A. et al., "Collisional activation and dissociation of large multiply charged proteins produced by electrospray ionization," *Analytica Chimica Acta,* 1990, 241, 167–173.

Loo, "Studying Noncovalent Protein Complexes by Electrospray Ionization Mass Spectrometry", *Mass Spectrometry Reviews,* 1997, 16, 1–23.

Loo, "Bioanalytical Mass Spectrometry: Many Flavors to Choose", *Bioconjugate Chem.,* 1995, 6, 644–655.

Loo, "Observation of Large Subunit Protein Complexes by Electrospray Ionization Mass Spectrometry", *J. Mass Spectrom.,* 1995, 30, 180–183.

Loo et al., "Use of Electrospray Ionization Mass Spectrometry to Probe Antisense Peptide Interactions", *Biol. Mass Spectrom.,* 1994, 23, 6–12.

Loo et al., "Interaction of Angiotensin Peptides and Zinc Metal Ions Probed by Electrospray Ioniztion Mass Spectrometry", *J. Am. Soc. Mass Spectrom.,* 1994, 5(11), 959–965.

Marshall et al., "Fouriere Transform Ion Cyclotron Resonance Mass Spectrometry: The Teenage Years", *Anal. Chem.,* 1991, 63(4), A215–A229.

Marshall et al., "Fourier Transform Ion Cyclotron Resonance Mass Spectrometry: A Primer", *Mass Spectrom. Rev.,* 1998, 17, 1–35.

McLuckey et al., "Tandem Mass Spectrometry of Small, Multiply Charged Oligonucleotides", *J. Am. Soc. Mass Spectrom.,* 1992, 3(1), 60–70.

McLuckey et al., "Decompositions of Multiply Charged Oligonucleotide Anions", *J. Am. Chem. Soc.,* 1993, 115, 12085–12095.

Murray, K.K., "DNA Sequencing by Mass Spectrometry," *Jour. Of Mass Spectrometry,* 1996, 31, 1203–1215.

Nelson et al., "Mass Determination of Human Immunoglobulin IgM Using Matrix–assisted Laser Desorption/Ionization Time–of–flight Mass Spectrometry", *Rapid Commun. Mass Spectrom.,* 1994, 8, 627–631.

Ni et al., "Interpretation of Oligonucleotide Mass Spectra for Determinationof Sequence Using Electrospray Ionization and Tandem Mass Spectrometry", *Anal. Chem.,* 1996, 68, 1989–1999.

Nordhoff et al., "Direct Mass Spectrometric Sequencing of Low–picornole Amounts of Oligodeoxynucleotides with up to 21 Bases by Matric–assisted Laser Desorption/Ionization Mass Spectrometry", *J. Mass Spectrom.,* 1995, 30, 99–112.

Pieles et al., "Matrix–assisted laser desorption ionization time–of–flight mass spectrometry: a powerful tool for the mass and sequence analysis of natural and modified oligonucleotides", *Nucl. Acids Res.,* 1993, 21(14), 3191–3196.

Price, W.D. et al., "Tandem Mass Spectrometry of Large Biomolecule Ions by Blackbody Infrared Radiative Dissociation," *Anal. Chem.,* 1996, 68, 859–866.

Robinson et al., "Hydrogen/Deuterium Exchange of Nucleotides in the Gas Phase,"*Anal. Chem.,* 1998, 70, 3566–3571.

Rockwood, A.L. et al., "Thermally Induced Dissociation of Ions from Electrospray Mass Spectrometry," *Rapid Communications in Mass Spectrometry,* 1991, 5, 582–585.

Rossomando et al., "Identification of Tyr–185 as the site of tyrosine autophosphorylation of recombinant mitogen–activated protein kinase $p42^{mapk}$", *Proc. Natl. Acad. Sci USA,* 1992, 89, 5779–5783.

Senko, M.W. et al., "External Accumulation of Ions for Enhanced Electrospray Ionization Fourier Transform Ion Cyclotron Resonance Mass Spectrometry," *J. Am. Soc. Mass Spectrom.,* 1997, 8, 970–976.

Senko, M.W. et al., "Collisional Activation of Large Multiply Charged Ions Using Fourier Transform Mass Spectrometry," *Anal. Chem.,* 1994, 66, 2801–2808.

Shaler et al., "Analysis of Enzymatic DNA Sequencing Reactions by Matrix–assisted Laser Desorption/Ionization Time–of–flight Mass Spectrometry", *Rapid Commun. Mass Spectrom.,* 1995, 9, 942–947.

Skoog, D.A. et al., "The Mass Spectrometer," in *Principles of Instrumental Analysis,* Second Edition, Saunders College, Philadelphia, PA, 1980, 477–499.

Smith et al., "The Observation of Non–covalent Interactions in Solution by Electrospray Ionization Mass Spectrometry: Promise, Pitfalls and Prognosis", *J. Biol. Mass Spectrom.,* 1993, 22, 493–501.

Smith et al., "New Developments in Biochemical Mass Spectrometry: Electrospray Ionization", *Anal. Chem.,* 1990, 62, 882–899.

Smith et al., "New mass spectrometric methods for the study of nocovalent associations of biopolymers", *Chem. Soc. Rev.,* 1997, 26, 191–202.

Vartanian, V.H. et al., "Advances in Trapped Ion Cells for Fourier Transform Ion Cyclotron Resonance Mass Spectrometry," *Mass Spectrom. Rev.,* 1995, 14, 1–19.

White, F.M. et al., "An External Source 7T Fourier Transform Ion Cyclotron Resonance Mass Spectrometer with Electrostatic Ion Guide," *Rapid Communications in Mass Spectrometry,* 1996, 10, 1845–1849.

Williams, W.V. et al., "Surface–Induced Dissociation of Peptide Ions in Fourier–Transform Mass Spectrometry," *J. Am. Soc. Mass Spectrom,* 1990, 1, 413–416.

Williams, E.R. et al., "Efficiency of Collisionally–Activate Dissociation and 193–nm Photodissociation of Peptide Ions in Fourier Transform Mass Spectrometry," *J. Am. Soc. Mass Spectrom.,* 1990, 1, 288–294.

Winger et al., "High–Resolution Accurate Mass Measurement of Biomolecules Using a New Electrospray Ionization Ion Cyclotron Resonance Mass Spectrometer", *J. Am. Soc. Mass Spectrom.,* 1993, 4(7), 566–577.

Witkowska et al., "Mass Spectrometric Analysis of a Native Zinc–Finger Structure: The Glucocorticoid Receptor DNA Binding Domain", *J. Am. Chem. Soc.,* 1995, 117(12), 3319–3324.

Zubarev, R.A. et al., "Electron Capture Dissociation of Multiply Charged Protein Cations. A Nonergodic Process., " *J. Am. Chem. Soc.,* 1998, 120, 3265–3266.

Cole, in *Electrospray Ionization Mass Spectrometry: Fundamentals, Instrumentation,* Wiley, New York, 1997.

Constantin and Schnell, *Mass Spectrometry,* Ellis Horwood, New York, 1990.

Ens et al. (eds.), *New Methods for the Study of Biomolecular Complexes,* (Proceedings of the NATO Advanced Research Workshop, held in Alberta, Canada, on Jun. 16–20, 1996, Ser. C., 1998, vol. 510, Kluwer, Dordrecht, Neth., 1998, 1–354.

Loo et al., in *Proc. 43rd ASMS Conf. On Mass Spectrom. and Allied Topics,* 1995.

Snyder, in *Biochemical and Biotechnological Applications of Electrospray Ionization Mass,* American Chemical Society, Washingotn, DC, 1996.

Brodbelt, "Analytical Applications of Ion–Molecule reactions", Mass Spectrometry Reviews, 16, 91–110; 1997.

Guan et al., "High Performance Detection of Biomolecules Using a High Magnetic Field Electrospray Ionization Source/Fourier Transform Ion Cyclotron Resonance Mass Spectrometer", Rev Sci Instrum. 66 (9), Sep. 1995.

Hannis et al., "Nanoelectrospray Mass Spectrometry Using Non–Metalized, Tapered (50W→10 $\mu$m) Fused–Silica Capillaries", Rapid Communications in Mass Spectrometry, 12, 443–448, 1998.

Skoog et al. Principals of Instrumental Analysis, Second Addition, Saunders College, 1980.

Robinson et al., Hydrogen/Deuterium Exchange of Nucleotides in the Gas Phase; Anal. Chem., 70, 3566–3571, 1998.

* cited by examiner-

| | |
|---|---|
| 10 | mass spec |
| 12 | vacuum chamber |
| 14 | 1st chamber |
| 16 | 2nd chamber |
| 18 | spray capillary |
| 20 | 1st electrode |
| 22 | X-Y manipulator |
| 24 | evaporative chamber |
| 26 | further capillary |
| 28 | plume |
| 30 | skimming cone |
| 32 | ion reservoir |
| 34 | port |
| 36 | valve |
| 38 | gate electrode |
| 40 | opening in electrode |
| 42 | mass analyzer |
| 44 | magnet |
| 46 | port |
| 48 | valve |
| 50 | lens |
| 52 | laser |
| 54 | mass spectrometer |
| 56 | vacuum housing |
| 58 | support rod |
| 60 | support rod |
| 62 | support member |
| 64 | X-Y manipulator |
| 66 | housing |
| 68 | spray capillary |
| 70 | receiving end |
| 72 | emitting end |
| 74 | electrode |
| 76 | septum |
| 78 | gas manifold |
| 80 | gas supply line |
| 82 | plume |
| 84 | ion source |
| 86 | inlet tube |
| 88 | inlet capillary |
| 90 | heating coil |
| 92 | exterior end |
| 94 | interior end |

FIGURE 3A

| | |
|---|---|
| 96 | skimming cone |
| 98 | ion reservoir |
| 100 | gate electrode |
| 102 | insulating ring |
| 104 | lead |
| 106 | opening in electrode |
| 108 | mass analyzer |
| 110 | 1st vacuum chamber |
| 112 | 2nd vacuum chamber |
| 114 | manifold |
| 116 | manifold |
| 118 | gas transfer line |
| 120 | manifold |
| 122 | leak valve |
| 124 | roughing value |
| 126 | supply valve |
| 128 | supply vial |
| 130 | end of line 118 |
| 132 | support bracket |
| 134 | actuator |
| 136 | actuator disk |
| 138 | shutter arm |
| 140 | sealing disk |
| 142 | control line |
| 144 | host computer |
| 146 | actuator |
| 148 | bracket |
| 150 | control line |
| 152 | disk |
| 154 | shutter arm |
| 156 | seal |
| 158 | window |

FIGURE 3B

Table 1

| Ion | $m/z_{mono}$ | Max. Exch. | Obs. H/D | Max. Exch. | Poss. H/D |
|---|---|---|---|---|---|
| $w_3^{(-)}$ | 971.085 | 8 | | 9 | |
| $(w_3\text{-Ad-}H_2O)^{(-)}$ | 818.022 | 5 | | 5 | |
| $w_4^{(2-)}$ | 657.553 | 11 | | 12 | |
| $w_5^{(3-)}$ | 539.704 | 14 | | 15 | |
| $w_7^{(3-)}$ | 560.786 | 17 | | 19 | |
| $y_7^{(3-)}$ | 748.056 | 18 | | 18 | |
| $w_8^{(4-)}$ | 857.735 | 20 | | 22 | |
| | | | | | |
| $a_3\text{-}B^{(-)}$ | 747.083 | 6 | | 7 | |
| $a_4\text{-}B^{(-)}$ | 1052.106 | 9 | | 10 | |
| $a_5\text{-}B^{(2-)}$ | 678.06 | 11 | | 12 | |
| $a_6\text{-}B^{(2-)}$ | 842.578 | 12 | | 15 | |
| $a_7\text{-}B^{(2-)}$ | 1007.096 | 12 | | 18 | |

FIGURE 10

EXTERNAL SHUTTER FOR ELECTROSPRAY IONIZATION MASS SPECTROMETRY

CROSS REFERENCED TO RELATED APPLICATION

This application is a continuation of U.S. application Ser. No. 09/332,685, filed Jun. 14, 1999, pending, the entirety of which is incorporated herein by reference.

This invention was made with United States Government support under NIST Contract 97-0025. The United States Government has certain rights in the invention.

FIELD OF THE INVENTION

The present invention relates to improved methods and apparatus for mass spectrometry. In particular the invention provides methods and apparatus that allows for an accumulation of a time slice of ions to be stored in an external ion reservoir of a mass spectrometer for subsequent ion-molecule, ion-ion or dissociation reactions. The methods and apparatus of the invention can be used in the analysis of ions of macromolecules including peptides, proteins, carbohydrates, oligonucleotides and nucleic acids as well as small molecules as prepared by combinatorial or classical medicinal chemistry.

BACKGROUND OF THE INVENTION

Mass spectrometry (MS) is a powerful analytical tool for the study of molecular structure and interaction between small and large molecules. The current state of the art in MS is such that sub-femtomole quantities of material can be readily analyzed to afford information about the molecular contents of the sample. An accurate assessment of the molecular weight of the material may be quickly obtained, irrespective of whether the sample's molecular weight is several hundred, or in excess of a hundred thousand, atomic mass units or Daltons (Da). It has now been found that mass spectrometry can elucidate significant aspects of important biological molecules. One reason for the utility of MS as an analytical tool is the availability of a variety of different MS methods, instruments, and techniques which can provide different pieces of information about the samples.

A mass spectrometer analyzes charged molecular ions and fragment ions from sample molecules. These ions and fragment ions are then sorted based on their mass to charge ratio (m/z). A mass spectrum is produced from the abundance of these ions and fragment ions that is characteristic of every compound. In the field of biotechnology, mass spectrometry can be used to determine the structure of a biomolecule. Of particular interest is the ability of mass spectrometry to be used in determining the sequence of oligonucleotides, peptides, and oligosaccharides. Particular mass spectrometric techniques have been used to deduce the sequence of an oligonucleotide (Murray, *J. Mass Spec*., 1996, 31, 1203–1215). Mass spectrometry is also commonly used for the sequencing of peptides and proteins (Biemann, *Annu. Rev. Biochem*., 1992, 61, 977–1010).

In principle, mass spectrometers consist of at least four parts: (1) an inlet system; (2) an ion source; (3) a mass analyzer; and (4) a mass detector/ion-collection system (Skoog, D. A. and West, D. M., Principles of Instrumental Analysis, Saunders College, Philadelphia, Pa., 1980, 477–485). The inlet system permits the sample to be introduced into the ion source. Within the ion source, molecules of the sample are converted into gaseous ions. The most common methods for ionization are electron impact (EI), electrospray ionization (ESI), chemical ionization (CI) and matrix-assisted laser desorption ionization (MALDI). A mass analyzer resolves the ions based on mass-to-charge ratios. Mass analyzers can be based on magnetic means (sector), time-of-flight, quadrupole and Fourier transform mass spectrometry (FTMS). A mass detector collects the ions as they pass through the detector and records the signal. Each ion source can potentially be combined with each type of mass analyzer to generate a wide variety of mass spectrometers.

Mass spectrometry ion sources are well-known in the art. Two commonly used ionization methods are electrospray ionization (ESI) and matrix-assisted laser desorption/ionization (MALDI) (Smith et al., Anal. Chem., 1990, 62, 882–899; Snyder, in Biochemical and Biotechnological Applications of Electrospray Ionization Mass Spectrometry, American Chemical Society, Washington, D.C., 1996; and Cole, in Electrospray Ionization Mass Spectrometry: Fundamentals, Instrumentation, Wiley, N.Y., 1997).

ESI is a gentle ionization method that results in no significant molecular fragmentation and preserves even weakly bound complexes between biopolymers and other molecules so that they are detected intact with mass spectrometry. ESI produces highly charged droplets of the sample being studied by gently nebulizing a solution of the sample in a neutral solvent in the presence of a very strong electrostatic field. This results in the generation of highly charged droplets that shrink due to evaporation of the neutral solvent and ultimately lead to a "coulombic explosion" that affords multiply charged ions of the sample material, typically via proton addition or abstraction, under mild conditions. Electrospray ionization mass spectrometry (ESI-MS) is particularly useful for very high molecular weight biopolymers such as proteins and nucleic acids greater than 10 kDa in mass, for it affords a distribution of multiply-charged molecules of the sample biopolymer without causing any significant amount of fragmentation. The fact that several peaks are observed from one sample, due to the formation of ions with different charges, contributes to the accuracy of ESI-MS when determining the molecular weight of the biopolymer because each observed peak provides an independent means for calculation of the molecular weight of the sample. Averaging the multiple readings of molecular weight so obtained from a single ESI-mass spectrum affords an estimate of molecular weight that is much more precise than would be obtained if a single molecular ion peak were to be provided by the mass spectrometer. Further adding to the flexibility of ESI-MS is the capability of obtaining measurements in either the positive or negative ionization modes.

ESI-MS has been used to study biochemical interactions of biopolymers such as enzymes, proteins and macromolecules such as oligonucleotides and nucleic acids and carbohydrates and their interactions with their ligands, receptors, substrates or inhibitors (Bowers et al., *Journal of Physical Chemistry*, 1996, 100, 12897–12910; Burlingame et al., *J. Anal. Chem*., 1998, 70, 647R-716R; Biemann, *Ann. Rev. Biochem*., 1992, 61, 977–1010; and Crain et al., *Curr. Opin. Biotechnol*., 1998, 9, 25–34). While interactions that lead to covalent modification of biopolymers have been studied for some time, one of the most significant developments in the field has been the observation, under appropriate solution conditions and analyte concentrations, of specific non-covalently associated macromolecular complexes that have been promoted into the gas-phase intact (Loo, *Mass Spectrometry Reviews*, 1997, 16, 1–23; Smith et al.,

*Chemical Society Reviews*, 1997, 26, 191–202; Ens et al., Standing and Chernushevich, Eds., *New Methods for the Study of Biomolecular Complexes, Proceedings of the NATO Advanced Research Workshop*, held Jun. 16–20 1996, in Alberta, Canada, in NATO ASI Ser., Ser. C, 1998, 510, Kluwer, Dordrecht, Netherlands).

A variety of non-covalent complexes of biomolecules have been studied using ESI-MS and reported in the literature (Loo, Bioconjugate Chemistry, 1995, 6, 644–665; Smith et al., J. Biol. Mass Spectrom. 1993, 22, 493–501; Li et al., J. Am. Chem. Soc., 1993, 115, 8409–8413). These include the peptide-protein complexes (Busman et al., Rapid Commun. Mass Spectrom., 1994, 8, 211–216; Loo et al., Biol. Mass Spectrom., 1994, 23, 6–12; Anderegg and Wagner, J. Am. Chem. Soc., 1995, 117, 1374–1377; Baczynskyj et al., Rapid Commun. Mass Spectrom., 1994, 8, 280–286), interactions of polypeptides and metals (Loo et al., J. Am. Soc. Mass Spectrom., 1994, 5, 959–965; Hu and Loo, J. Mass Spectrom., 1995, 30, 1076–1079; Witkowska et al., J. Am. Chem. Soc., 1995, 117, 3319–3324; Lane et al., J. Cell Biol., 1994, 125, 929–943), and protein-small molecule complexes (Ganem and Henion, ChemTracts-Org. Chem., 1993, 6, 1–22; Henion et al., Ther. Drug Monit., 1993, 15, 563–569; Ganguly et al., *Tetrahedron*, 1993, 49, 7985–7996, Baca and Kent, J. Am. Chem. Soc., 1992, 114, 3992–3993). Further, the study of the quaternary structure of multimeric proteins (Baca and Kent, J. Am. Chem. Soc., 1992, 114, 3992–3993; Light-Wahl et al., J. Am. Chem. Soc., 1994, 116, 5271–5278; Loo, J. Mass Spectrom., 1995, 30, 180–183, Fitzgerald et al., *Proc. Natl. Acad. Sci. USA*, 1996, 93, 6851–6856), and of nucleic acid complexes (Light-Wahl et al., J. Am. Chem. Soc., 1993, 115, 803–804; Gale et al., J. Am. Chem. Soc., 1994, 116, 6027–6028; Goodlett et al., Biol. Mass Spectrom., 1993, 22, 181–183; Ganem et al., Tet. Lett., 1993, 34, 1445–1448; Doctycz et al., Anal. Chem., 1994, 66, 3416–3422; Bayer et al., Anal. Chem., 1994, 66, 3858–3863; Greig et al., J. Am. Chem. Soc., 1995, 117, 10765–766), protein-DNA complexes (Cheng et al., Proc. Natl. Acad. Sci. U.S.A., 1996, 93, 7022–7027), multimeric DNA complexes (Griffey et al., Proc. SPIE-Int. Soc. Opt. Eng., 1997, 2985, 82–86), and DNA-drug complexes (Gale et al., JACS, 1994, 116, 6027–6028) are known in the literature.

ESI-MS has also been effectively used for the determination of binding constants of noncovalent macromolecular complexes such as those between proteins and ligands, enzymes and inhibitors, and proteins and nucleic acids. The use of ESI-MS to determine the dissociation constants ($K_D$) for oligonucleotide-bovine serum albumin (BSA) complexes have been reported (Greig et al., J. Am. Chem. Soc., 1995, 117, 10765–10766). The $K_D$ values determined by ESI-MS were reported to match solution $K_D$ values obtained using capillary electrophoresis.

ESI-MS measurements of enzyme-ligand mixtures under competitive binding conditions in solution afforded gas-phase ion abundances that correlated with measured solution-phase dissociation constants ($K_D$) (Cheng et al., JACS, 1995, 117, 8859–8860). The binding affinities of a 256-member library of modified benzenesulfonamide inhibitors to carbonic anhydrase were ranked. The levels of free and bound ligands and substrates were quantified directly from their relative abundances as measured by ESI-MS and these measurements were used to quantitatively determine molecular dissociation constants that agree with solution measurements. The relative ion abundance of non-covalent complexes formed between D- and L-tripeptides and vancomycin group antibiotics were also used to measure solution binding constants (Jorgensen et al., Anal. Chem., 1998, 70, 4427–4432).

Matrix-Assisted Laser Desorption/Ionization Mass Spectrometry (MALDI-MS) is another ion source method that can be used for studying biomolecules (Hillenkamp et al., Anal. Chem., 1991, 63, 1193A-1203A). This technique ionizes high molecular weight biopolymers with minimal concomitant fragmentation of the sample material. This is typically accomplished via the incorporation of the sample to be analyzed into a matrix that absorbs radiation from an incident UV or IR laser. This energy is then transferred from the matrix to the sample resulting in desorption of the sample into the gas phase with subsequent ionization and minimal fragmentation. One of the differences of MALDI-MS versus ESI-MS is the simplicity of the spectra obtained, as MALDI spectra are generally dominated by singly charged species. Typically, the detection of the gaseous ions generated by MALDI techniques, are detected and analyzed by determining the time-of-flight (TOF) of these ions. While MALDI-TOF MS is not a high resolution technique, resolution can be improved by making modifications to such systems, by the use of tandem MS techniques, or by the use of other types of analyzers, such as Fourier transform (FT) and quadrupole ion traps.

ESI and MALDI techniques have found application for the rapid and straightforward determination of the molecular weight of certain biomolecules (Feng and Konishi, Anal. Chem., 1992, 64, 2090–2095; Nelson et al., Rapid Commun. Mass Spectrom., 1994, 8, 627–631). These techniques have been used to confirm the identity and integrity of certain biomolecules such as peptides, proteins, oligonucleotides, nucleic acids, glycoproteins, oligosaccharides and carbohydrates. Further, these MS techniques have found biochemical applications in the detection and identification of post-translational modifications on proteins. Verification of DNA and RNA sequences that are less than 100 bases in length has also been accomplished using ESI with FTMS to measure the molecular weight of the nucleic acids (Little et al, Proc. Natl. Acad. Sci. USA, 1995, 92, 2318–2322).

While data generated and conclusions reached from ESI-MS studies for weak non-covalent interactions generally reflect, to some extent, the nature of the interaction found in the solution-phase, it has been pointed out in the literature that control experiments are necessary to rule out the possibility of ubiquitous non-specific interactions (Smith and Light-Wahl, Biol. Mass Spectrom., 1993, 22, 493–501). The use of ESI-MS and MALDI-MS has been applied to study multimeric proteins because the gentleness of the electrospray/desorption process allows weakly-bound complexes, held together by hydrogen bonding, hydrophobic and/or ionic interactions, to remain intact upon transfer to the gas phase. The literature shows that not only do ESI-MS data from gas-phase studies reflect the non-covalent interactions found in solution, but that the strength of such interactions may also be determined. The binding constants for the interaction of various peptide inhibitors to src SH2 domain protein, as determined by ESI-MS, were found to be consistent with their measured solution phase binding constants (Loo et al., Proc. 43$^{rd}$ ASMS Conf. on Mass Spectrom and Allied Topics, 1995). ESI-MS has also been used to generate Scatchard plots for measuring the binding constants of vancomycin antibiotics with tripeptide ligands (Lim et al., J. Mass Spectrom., 1995, 30, 708–714).

Similar experiments have been performed to study non-covalent interactions of nucleic acids. Both ESI-MS and MALDI-MS have been applied to study the non-covalent interactions of nucleic acids and proteins. While MALDI does not typically allow for survival of an intact non-covalent complex, the use of crosslinking methods to generate covalent bonds between the components of the complex allows for its use in such studies. Stoichiometry of interaction and the sites of interaction have been ascertained for nucleic acid-protein interactions (Jensen et al., Rapid Commun. Mass Spectrom., 1993, 7, 496–501; Jensen et al., $42^{nd}$ ASMS Conf. on Mass Spectrom. and Allied Topics, 1994, 923). The sites of interaction are typically determined by proteolysis of either the non-covalent or covalently crosslinked complex (Jensen et al., Rapid Commun. Mass Spectrom., 1993, 7, 496–501; Jensen et al., $42^{nd}$ ASMS Conf. on Mass Spectrom. and Allied Topics, 1994, 923; Cohen et al., Protein Sci., 1995, 4, 1088–1099). Comparison of the mass spectra with those generated from proteolysis of the protein alone provides information about cleavage site accessibility or protection in the nucleic acid-protein complex and, therefore, information about the portions of these biopolymers that interact in the complex.

So-called “hyphenated” techniques can be used for structure elucidation because they provide the dual features of separation and mass detection. Such techniques have been used for the separation and identification of certain components of mixtures of compounds such as those isolated from natural products, synthetic reactions, or combinatorial chemistry. Hyphenated techniques typically use a separation method as the first step: liquid chromatography methods such as HPLC, microbore LC, microcapillary LC, or capillary electrophoresis are typical separation methods used to separate the components of such mixtures. Many of these separation methods are rapid and offer high resolution of components while also operating at low flow rates that are compatible with MS detection. In those cases where flow rates are higher, the use of ‘megaflow’ ESI sources and sample splitting techniques have facilitated their implementation with on-line mass spectrometry. The second stage of these hyphenated analytical techniques involves the injection of separated components directly into a mass spectrometer, so that the spectrometer serves as a detector that provides information about the mass and composition of the materials separated in the first stage. While these techniques are valuable from the standpoint of gaining an understanding of the masses of the various components of multi component samples, they are incapable of providing structural detail. Some structural detail, however, may be ascertained through the use of tandem mass spectrometry, e.g., hydrogen/deuterium exchange or collision induced disassociation (CID).

Tandem mass spectrometry (MSN) involves the coupled use of two or more stages of mass analysis where both the separation and detection steps are based on mass spectrometry. The first stage is used to select an ion or component of a sample from which further structural information is to be obtained. This selected ion is then fragmented by (CID) or photo dissociation. The second stage of mass analysis is then used to detect and measure the mass of the resulting fragments or product ions. The advent of Fourier Transform ion cyclotron resonance mass spectrometry (FT-ICR MS) has made a significant impact on the utility of tandem, $MS^N$ procedures because of the ability of FTICR to select and trap specific ions of interest and its high resolution and sensitivity when detecting fragment ions. Such ion selection followed by fragmentation routines can be performed multiple times so as to essentially completely dissect the molecular structure of a sample. A two-stage tandem MS experiment would be called a MS-MS experiment while an n-stage tandem MS experiment would be referred to as a $MS^N$ experiment. Depending on the complexity of the sample and the level of structural detail desired, $MS^N$ experiments at values of n greater than 2 may be performed.

While tandem ESI mass spectra of oligonucleotides are often complex, several groups have successfully applied ESI tandem MS to the sequencing of large oligonucleotides (McLuckey et al., J. Am. Soc. Mass Spectrom., 1992, 3, 60–70; McLuckey and Habibigoudarzi, J. Am. Chem. Soc., 1993, 115, 12085–12095; Little et al., J. Am. Chem. Soc., 1994, 116, 4893–4897). General rules for the principal dissociation pathways of oligonucleotides, as formulated by McLuckey (McLuckey et al., J. Am. Soc. Mass Spectrom., 1992, 3, 60–70; Mcluckey and Habibigoudarzi, J. Am. Chem. Soc., 1993, 115, 12085–12095) have assisted interpretation of mass spectra of oligonucleotides, and include observations of fragmentation such as, for example, the stepwise loss of a base followed by cleavage of the 3'—C—O bond of the relevant sugar. Besides the use of ESI with tandem MS for oligonucleotide sequencing, two other mass spectrometric methods are also available: mass analysis of products of enzymatic cleavage of oligonucleotides (Pieles et al., Nucleic Acids Res., 1993, 21, 3191–3196; Shaler et al., Rapid Commun. Mass Spectrom., 1995, 9, 942–947; Glover et al., Rapid Commun. Mass Spectrom., 1995, 9, 897–901), and the mass analysis of fragment ions arising from the initial ionization/desorption event, without the use of mass selection techniques (Little et al., Anal. Chem., 1994, 66, 2809–2815; Nordhoff et al., J. Mass Spectrom., 1995, 30, 99–112; Little et al., J. Am. Chem. Soc., 1994, 116, 4893–4897; Little and McLafferty, J. Am. Chem. Soc., 1995, 117, 6783–6784). While determining the sequence of deoxyribonucleic acids (DNA) is possible using ESI-MS and CID techniques (McLuckey et al., J. Am. Soc. Mass Spectrom., 1992, 3, 60–70; McLuckey and Habibigoudarzi, J. Am. Chem. Soc., 1993, 115, 12085–12095), the determination of RNA sequence is much more difficult. Thus while small RNA, such as 6-mers, have been sequenced (McCloskey et al., J. Am. Chem. Soc., 1993, 115, 12085–1095), larger RNA have been difficult to sequence using mass spectrometry. Tandem ESI-MS methods can also be used to determine the binding sites for small molecules that bind to RNA targets (Griffey et al., *Journal of the American Society for Mass Spectrometry*, 1995, 6, 1154–1164).

Ion trap-based mass spectrometers are particularly well suited for such tandem experiments because the dissociation and measurement steps are temporarily rather than spatially separated. For example, a common platform on which tandem mass spectrometry is performed is a triple quadrupole mass spectrometer. The first and third quadrupoles serve as mass filters while the second quadrupole serves as a collision cell for collisionally activated dissociation (CAD), also known as collision induced dissociation (CID). In a trap-based mass spectrometer, parent ion selection and dissociation take place in the same part of the vacuum chamber and are effected by control of the radio frequency wavelengths applied to the trapping elements and the collision gas pressure. Hence, while a triple quadrupole mass analyzer is limited to two stages of mass spectrometry (i.e. MS/MS), ion trap-based mass spectrometers can perform $MS^n$ analysis in which the parent ion is isolated, dissociated, mass analyzed and a fragment ion of interest is isolated, further dissociated, and mass analyzed and so on. A number of $MS^4$ procedures and higher have appeared in the literature in recent years and can be used here. See, Cheng et al., Techniques in Protein Chemistry, VII, pp. 13–21.

ESI tandem MS has been used for the study of high molecular weight proteins, for peptide and protein sequencing, identification of post-translational modifications such as phosphorylation, sulfation or glycosylation, and for the study of enzyme mechanisms (Rossomando et al., Proc. Natl. Acad. Sci. USA, 1992, 89, 5779–578; Knight et al., Biochemistry, 1993, 32, 2031–2035). Covalent enzyme-intermediate or enzyme-inhibitor complexes have been detected using ESI and analyzed by ESI-MS to ascertain the site(s) of modification on the enzyme. The literature has shown examples of protein sequencing where the multiply charged ions of the intact protein are subjected to collisionally activated dissociation to afford sequence informative fragment ions (Light-Wahl et al., Biol. Mass Spectrom., 1993, 22, 112–120). ESI tandem MS has also been applied to the study of oligonucleotides and nucleic acids (Ni et al., Anal. Chem., 1996, 68, 1989–1999; Little et al., Proc. Natl. Acad. Sci., 1995, 92, 2318–2322).

Fourier transform ion cyclotron resonance mass spectrometry (FT-ICR MS) is an especially useful analytical technique because of its ability to resolve very small mass differences to make mass measurements with a combination of accuracy and resolution that is superior to other MS detection techniques, in connection with ESI or MALDI ionization (Amster, J. Mass Spectrom., 1996, 31, 1325–1337, Marshall et al., *Mass Spectrom. Rev.*, 1998, 17, 1–35). FT-ICR MS may be used to obtain high resolution mass spectra of ions generated by any of the other ionization techniques. The basis for FT-ICR MS is ion cyclotron motion, which is the result of the interaction of an ion with a unidirectional magnetic field. The mass-to-charge ratio of an ion (m/q or m/z) is determined by a FT-ICR MS instrument by measuring the cyclotron frequency of the ion. The insensitivity of the cyclotron frequency to the kinetic energy of an ion is one of the fundamental reasons for the very high resolution achievable with FT-ICR MS. Each small molecule with a unique elemental composition carries an intrinsic mass label corresponding to its exact molecular mass, identifying closely related library members bound to a macromolecular target requires only a measurement of exact molecular mass. The target and potential ligands do not require radio labeling, fluorescent tagging, or deconvolution via single compound re-synthesis. Furthermore, adjustment of the concentration of ligand and target allows ESI-MS assays to be run in a parallel format under competitive or non-competitive binding conditions. Signals can be detected from complexes with dissociation constants ranging from <10 nM to ~100 mM. FT-ICR MS is an excellent detector in conventional or tandem mass spectrometry, for the analysis of ions generated by a variety of different ionization methods including ESI and MALDI, or product ions resulting from CAD.

FTICR-MS, like ion trap and quadrupole mass analyzers, allows selection of an ion that may actually be a weak non-covalent complex of a large biomolecule with another molecule (Marshall and Grosshans, Anal. Chem., 1991, 63, A215-A229; Beu et al., J. Am. Soc. Mass Spectrom., 1993, 4, 566–577; Winger et al., J. Am. Soc. Mass Spectrom., 1993, 4, 566–577; Huang and Henion, Anal. Chem., 1991, 63, 732–739), or hyphenated techniques such as LC-MS (Bruins et al., Anal. Chem., 1987, 59, 2642–2646; Huang and Henion, J. Am. Soc. Mass Spectrom., 1990, 1, 158–65; Huang and Henion, Anal. Chem., 1991, 63, 732–739) and CE-MS experiments (Cai and Henion, J. Chromatogr., 1995, 703, 667–692). FTICR-MS has also been applied to the study of ion-molecule reaction pathways and kinetics.

The use of ESI-FTICR mass spectrometry as a method to determine the structure and relative binding constants for a mixture of competitive inhibitors of the enzyme carbonic anhydrase has been reported (Cheng et al., J. Am. Chem. Soc., 1995, 117, 8859–8860). Using a single ESI-FTICR-MS experiment these researchers were able to ascertain the relative binding constants for the noncovalent interactions between inhibitors and the enzyme by measuring the relative abundances of the ions of these noncovalent complexes. Further, the $K_D$S so determined for these compounds paralleled their known binding constants in solution. The method was also capable of identifying the structures of tight binding ligands from small mixtures of inhibitors based on the high resolution capabilities and multistep dissociation mass spectrometry afforded by the FTICR technique. A related study (Gao et al., J. Med. Chem., 1996, 39, 1949–55) reports the use of ESI-FTICR-MS to screen libraries of soluble peptides in a search for tight binding inhibitors of carbonic anhydrase II. Simultaneous identification of the structure of a tight binding peptide inhibitor and determination of its binding constant was performed. The binding affinities determined from mass spectral ion abundance were found to correlate well with those determined in solution experiments. Further, the applicability of this technique to drug discovery efforts is limited by the lack of information generated with regards to sites and mode of such noncovalent interactions between a protein and ligands.

Improvements in mass spectrometric instrumentation and methodologies are needed to address increasingly challenging applications in a number of research arenas including the physical, biological, and medical sciences. In many implementations of mass spectrometers based on Penning and Paul traps, ion formation, isolation, and detection take place in the same region of a vacuum chamber and are temporally rather than spatially separated. In a typical pulse, sequence ions are alternatively formed and detected; the ionization duty cycle is defined as the fraction of time ions are formed compared to the overall experiment time. In high resolution measurements, which may take several seconds to perform yet require ionization intervals of only a few milliseconds, the overall ionization duty cycle is only a few percent. A number of approaches have been explored to improve the ionization duty cycle including schemes in which ions are formed and continuously accumulated in an external ion reservoir and periodically gated into the mass analyzer. For example, a Penning trap in the fringing magnetic field of an Fourier transform ion cyclotron resonance (FTICR) mass spectrometer was used to accumulate ions formed by EI during high resolution measurements in the FTICR cell. See, Hofstadler and Laude, Jr., Anal. Chem., 1991, 63, 2001–2007. An external ion reservoir formed by an rf-only multipole bounded by two electrostatic elements can efficiently accumulate ions generated by electrospray ionization and the ion ensemble can be periodically pulsed into the FTICR cell for mass analysis has also been demonstrated (Senko et al., *J. Amer. Soc. Mass Spectrom.*, 1997, 8, 970–976).

Another means of improving mass spectra is the use of dissociation to fragment the molecular ions. Dissociation strategies for tandem ESI-MS can be separated into two general categories: those which take place in the ESI source prior to mass analysis, and those which take place after the ESI source and often rely on some form of m/z dependent ion manipulation. For example, it has been demonstrated that large multiply-charged proteins could be effectively dissociated by employing a relatively large voltage difference between the exit of the desolvating capillary and the skimmer cone (Loo et al., *Anal. Chim. Acta*, 1990, 241, 167–173). It has also been demonstrated that ions could be thermally dissociated in the ESI source by heating the desolvation capillary to extreme temperatures (Rockwood et al., *Rapid Comm. Mass Spectrom.*, 1991, 5, 582–585). Both of these "in-source" dissociation schemes produce mass spectra which are rich in fragment ions and can provide sequence information for peptides, proteins, or oligonucleotides. Alternatively, a number of post-source dissociation schemes have been presented which are now widely employed. In general, scanning MS/MS instruments such as triple quadrupoles and magnetic sector instruments employ collisionally activated dissociation (CAD) to effect the dissociation of an m/z selected parent ion (Dagostino et al., *J. Chrom.*, 1997, 767, 77–85). In addition to employing various forms of CAD (Gauthier et al., *Chim. Acta*, 1991, 246, 211–225; and Senko et al., *Anal. Chem.*, 1994, 66, 2801–2808), FTICR instruments have successfully demonstrated the use of UV-photodissociation (Williams et al., *J. Amer. Soc. Mass Spectrom.*, 1990, 1, 288–294), infrared multiphoton dissociation (IRMPD) (Little et al., *Anal. Chem.*, 1994, 66, 2809–2815), surface induced dissociation (SID) (I james and Wilkins, C. L., Anal. Chem., 1990, 62, 1295–1299; and Williams et al., *J. Amer. Soc. Mass Spectrom.*, 1990, 1, 413–416), blackbody infrared radiative dissociation (BIRD) (Price et al., *Anal. Chem.*, 1996, 68, 859–866), and more recently, electron capture dissociation (ECD) (Zubarev et al., *J. Am. Chem. Soc.*, 1998, 120, 3265–3266) to fragment precursor ions.

Collisionally activated dissociation (CAD), also known as collision induced dissociation (CID), is a method by which analyte ions are dissociated by energetic collisions with neutral or charged species, resulting in fragment ions which can be subsequently mass analyzed. Mass analysis of fragment ions from a selected parent ion can provide certain sequence or other structural information relating to the parent ion. Such methods are generally referred to as tandem mass spectrometry (MS or MS/MS) methods and are the basis of the some of MS based biomolecular sequencing schemes being employed today.

Infrared multi-photon dissociation (IRMPD) uses photodissociation generally in combination with FTICR or quadrupole ion trap mass analyzers. In this method, ions are collected in the FTICR analyzer cell and the laser interacts with ions within the cell. In IRMPD, the laser dissociates ions into fragment ions, as opposed to an ionization method involving lasers, e.g. MALDI. The most common method of ionization used in IRMPD methods is electrospray ionization as this provides more highly charged ions that are more easily dissociated, as compared to MALDI. Little et al., *Anal. Chem.*, 1994, 66, 2809–2815. IRMPD has been used for protein and nucleotide sequencing (Little et al., *Anal. Chem.*, 1994, 66, 2809–2815). IRMPD has also been used with quadrupole ion trap mass spectrometers (Colorado et al., *Anal. Chem.*, 1996, 68, 4033–4043).

Studies have demonstrated that oligonucleotides and nucleic acids obey certain fragmentation patterns during collisionally induced dissociation (CID), and that these fragments and patterns can be used to determine the sequence of the nucleic acid (McLuckey et al., J.Am.Soc. Mass Spectrom., 1992, 3, 60–70; McLuckey and Haaabibigoudarzi, J.Am.Chem. Soc., 1993, 115, 12085–12095). Electrospray ionization produces several multiply charged ions of the parent nucleic acid, without any significant fragmentation of the nucleic acid. Typically, a single charge state of the nucleic acid is isolated using a triple quadrupole ion trap, or ion cyclotron resonance (ICR) device. This ion is then excited and allowed to collide with a neutral gas such as helium, argon, or nitrogen so as to afford cleavage of certain bonds in the nucleic acid ion, or excited and fragmented with a laser pulse. Typically, two series of fragment ions are found to be formed: the a-Base series (a-B) and the w series.

The series of a-Base fragments originates from initial cleavage of the glycosidic bond by simultaneous abstraction of a C-2' proton, followed by the elimination of the 3'-phosphate group and the C-4' proton. This fragmentation scheme results in a residual fragment attached to the 3'-phosphate and affords a series of a-Base fragments whose masses increase sequentially from the 5'-terminus of the nucleic acid. Measurement of the masses of these collisionally induced fragments therefore affords the determination of the sequence of the nucleic acid in the 5' to 3' direction. The w series of fragments is generated via cleavage of the nucleic acid in a manner that leaves a phosphate residue on each fragment. Similarily, y fragments are based on cleavage of the nucleic acid in a manner that cleaves a phosphate residue. Thus monitoring the masses of w-series and y-series fragments allows determination of the sequence of the nucleic acid in the 3' to 5' direction. Using the sequence information generated from the series of fragments the sequence of deoxyribonucleic acids (DNA) may be ascertained. Obtaining similar mass spectrometric information for ribonucleic acids (RNA), is a much more difficult task. Collisionally induced dissociation (CID) of RNA is much less energetically favored than is the case for DNA because of the greater strength of the glucosidic bond in RNA. Hence, while small RNA such as 6-mers have been sequenced using CID MS, the sequencing of larger RNA has not been generally successful using tandem MS.

Currently, IRMPD methods are limited to mass spectrometers based on FTICR and QIT. With FTICR methods the kinetic energy release which accompanies the dissociation event can cause a redistribution of the ions in the trapped ion cell. Upon excitation, these ions can obtain a range of cyclotron radii, which precludes high performance mass measurements. Also, the laser irradiation interval is identical for each ion, which limits the dissociation pathways available to the ion.

FTICR-MS, like ion trap and quadrupole mass analyzers, allows selection of an ion that may actually be a weak noncovalent complex of a large biomolecule with another molecule (Marshall and Grosshans, Anal. Chem., 1991, 63, A215-A229; Beu et al., J. Am. Soc. Mass Spectrom., 1993, 4, 566–577; and Winger et al., J. Am. Soc. Mass Spectrom., 1993, 4, 566–577); Huang and Henion, Anal. Chem., 1991, 63, 732–739), and is compatible with hyphenated techniques such as LC-MS (Bruins et al., Anal. Chem., 1987, 59, 2642–2646; Huang and Henion, J. Am. Soc. Mass Spectrom., 1990, 1, 158–65; and Huang and Henion, Anal. Chem., 1991, 63, 732–739) and CE-MS experiments (Cai and Henion, J. Chromatogr., 1995, 703, 667–692). FTICR-MS has also been applied to the study of ion-molecule reaction pathways and kinetics.

Tandem mass spectrometry, as performed using electrospray ionization (EST) on FTICR, triple quadrupole, or ion-trap mass spectrometers, has been found to be a powerful tool for determining the structure of biomolecules. It is known in the art that both small and large (>3000 kbase) RNA and DNA may be transferred from solution into the gas phase as intact ions using electrospray techniques. Further, it is known to those skilled in the art that these ions retain some degree of their solution structures as ions in the gas phase; this is especially useful when studying noncovalent complexes of nucleic acids and proteins, and nucleic acids and small molecules by mass spectrometric techniques.

A limited use of MS and shutters is known in the art. Certain internal shutters have been used to regulate or monitor ions after they have entered the mass spectrometer. Recently, the stability of an ion source was demonstrated by measuring the current of the electrosprayed ions at the shutter of the Fourier transform ICR mass spectrometer as a function of time (Hannis et al., Rapid Commun. Mass Spectrom. 1998, 12(8), 443–448). The use of an operating arm/shutter has been used for the simultaneous use of an ion collector and as a mass spectrometer connection. This feature allowed a simultaneous readout of real time ion detection and data received by the MS unit (Smith et al., U.S. Pat. No. 5,545,304, Ion Current Detector for High Pressure Ion Sources For Monitoring Separations). Electromechanical shutters have also been used to improve the system design of a mass spectrum. The addition of a downstream mechanical shutter to halt the flow of neutrals to the trapped ion cell during FT-ICR detection allowed for more than 100-fold improvement in pressure drop between the source and mass analyzer chamber to be realized (Guan et al., Rev. Sci. Instrum. 1995, 66(9), 4507–15). A set of electromechanical shutters were also used to minimize the effect of the directed molecular beam produced by the ESI source and were open only during injection (Winger et al., J. Am. Soc. Mass Spectrom. 1993, 4(7), 566–77).

Although improvements have been made in mass spectrometric analysis of biomolecules, especially with the use of mass spectrum shutters, there remains a need for further improved mass spectrometric methods and apparatuses.

BRIEF SUMMARY OF THE INVENTION

In a first embodiment of the invention there are provided methods and apparatuses that selectively isolate ions external to a mass analyzer of a mass spectrometer. Processes and devices are described for effecting ion-molecule and ion-ion reactions on these isolated ions by first injecting the ions into a space and then isolating these ions to prevent the introduction of new ions. Once the ions are isolated, a reactive moiety may be introduced for a time sufficient for at least some of the reactive moiety to react with at least some of the ions to form the reacted ions. The reacted ions formed are subsequently moved into an analyzer for analysis.

In an additional embodiment of the invention, after injecting the ions into a space, the introduction of a physical barrier in operative association with the space allows for the isolation of these ions to prevent the introduction of new ions. The barrier may include a seal to prevent the further introduction of new ions. The barrier may be a shutter where the shutter is connected to and is actuated by a signal from a host computer.

In further embodiment of the invention, the ion-molecule and ion-ion reactions that occur with the ions in the isolated space is effected by the introduction of a reactive moiety. The reactive moiety is introduced as a gas or a plasma and may be either a gas phase deuterated solvent ($D_2O$, $ND_3$ or $CH_3OD$), a gas phase acid (acetic acid, trifluoroacetic acid or hydroiodic acid) or a gas phase base (ammonia, dimethylamine, triethylamine or N,N,N',N'-tetramethyl-1,8-naphthylenediamine). The reactive moiety may also be an isotope such as deuterium, to effect an ion-molecule reaction. Generally, the reactive moiety should be a chemical isotope that is absent from the isotopic species that forms the elemental building blocks of the isolated ions. Ion-ion reactions may be effected by the introduction of a reactive moiety such as perfluoro-1,3-dimethylcyclohexane into the isolated population of ions.

In another embodiment of the invention, a population of ions to be modified, prior to introduction into a mass spectrometer analyzer, are first generated from an ion source. The beam of ions produced are allowed to enter the opening of the instrument. The opening is closed to segregate a population of ions from the further ions that are continually generated. This slice of ions is allowed to react with a reactive moiety and the ions are subsequently analyzed by mass spectrometry.

In a still further embodiment of the invention, a common ion source used is electrospray ionization. The shutter is optimally positioned between the ion source and the inlet capillary opening of the mass spectrometer. The solvated ions generated by the electrospray conditions are selected by the opening and closing of the shutter which allows the ions to accumulate in the instrument. The solvated ions enter the capillary opening of the mass spectrometer and are subsequently desolvated and stored prior to reaction with a reactive moiety. The selected population of ions can be reacted by effecting an isotopic exchange, for example, hydrogen may be exchanged for deuterium.

In another embodiment of the invention, processes of analyzing a population of ions can be accomplished by using an ion source which generates a continuous population of ions, some of which enter the opening of the mass spectrometer and can be stored in an ion reservoir. A physical barrier located between the ion source and the ion reservoir of the instrument allows for the physical interruption of the flow of ions. The isolated population of ions may be stored in the ion reservoir of the instrument for a fixed period of time. Subsequent release of the ions from the ion reservoir allows for analysis of the ions.

A further embodiment of the invention provides processes of analyzing a population of ions in a mass spectrometer that are stored in an ion reservoir which has both an inlet and an outlet. The inlet of the ion reservoir is guarded by a physical barrier. The physical barrier is positioned between the ion source and the inlet of the ion reservoir and allows for the selective accumulation of ions. The outlet of the ion reservoir may be guarded by a barrier. The outlet allows for the analysis of the ions through a mass analyzer. A common mass analyzer used is an FTICR ion mass analyzer. The inlet of the ion reservoir may be guarded by a barrier that has a seal. The inlet and the outlet of the ion reservoir may both be guarded by a barrier that has a seal for optimal performance of the instrument wherein the outlet may be connected to a mass analyzer.

Another embodiment of the invention involves improvements for electrospray ionization which generate a continuous population of solvated ions. The solvated ions can be accumulated into an ion reservoir which serves as a solvent evaporation region for the instrument. Physically interupting the flow of solvated ions between the ion source and the evaporation region affords an isolated population of ions in the ion reservoir.

In a further embodiment of the invention, an electrospray mass spectrometer can be improved by the use of a barrier such as a shutter that is positioned between the ion source and the opening of the solvent evaporation chamber. The solvated ions generated from the electrospray ionization can be blocked by the shutter from entering the solvent evaporation chamber. The barrier may include a seal for preventing the influx of ions from going into the solvent evaporation chamber. The barrier may be a shutter capable of being positioned in the path of the ions between the ion source and the solvent evaporation chamber. The shutter could be actuated by a computer to allow selective entry of a population of ions.

Preferably the population of ions includes protein ions, peptide ions, oligonucleotide ions, nucleic acid ions or carbohydrate ions and complexes of said protein ions, peptide ions, oligonucleotide ions, nucleic acid ions, or carbohydrate ions with other molecules that bind to said protein ions, peptide ions, oligonucleotide ions, nucleic acid ions, or carbohydrate ions. More preferably the population of ions includes protein ions, peptide ions, oligonucleotide ions, nucleic acid ions or carbohydrate ions.

In another embodiment of the invention, the vacuum pressure in an ion reservoir of an electrospray mass spectrometer may be modulated by the use of a barrier having a vacuum seal. The attached vacuum seal on the barrier, which is located between the ion source and the ion reservoir, closes the ion reservoir allowing modulation of the vacuum pressure in the ion reservoir.

In a further embodiment of the invention, the barrier is a shutter having a seal and is located between the ion source and the ion reservoir. Another barrier or shutter may be located between the ion reservoir and the mass analyzer and may be used to vacuum seal the ion reservoir. The use of the two described shutters and vacuum seals may be used in conjunction to modulate the vacuum pressure in the ion reservoir.

In another embodiment of the invention, an improvement to an electrospray mass spectrometer is afforded by sealing the ion reservoir using the above described shutters and vacuum seals to modulate the vacuum pressure of the instrument.

In another embodiment of the invention, the ion reservoir of an electrospray mass spectrometer may be isolated by the use of an upstream shutter located between the ion source and the ion reservoir.

In a further embodiment of the invention, the upstream shutter may include a seal or a vacuum seal capable of sealing the ion reservoir from the the ion source. The use of an upstream shutter and downstream shutter equipped with vacuum seals would allow for the modulation of the pressure in the mass spectrometer.

In another embodiment of the invention, an improvement to an electrospray mass spectrometer comprises an ion source,an ion reservoir, an analyzer and an upstream shutter which is capable of limiting the population of solvent and ions entering into the ion resevoir. Further, the ion reservoir is a multipole ion reservoir capable of serving as a desolvation chamber.

In a further embodiment of the invention,an improvement to an electrospray mass spectrometer comprises an ion source,an ion reservoir, an analyzer and an upstream shutter which is capable of limiting the population of -solvent and ions entering into the ion resevoir. Further, a laser that is positioned in operative association with the ion reservoir for exciting the solvated ions to vaporize the solvent and afford the desolvated ions.

The continual accumulation of ions in a multipole ion reservoir affords a weaker ion intensity as seen in the mass analyzer due to the unfocused nature of the ions. By holding a selected population of ions in the multipole for a certain time, for example from about 50 msec to about 200 msec, collisional focusing occurs resulting in a greater ion intensity as seen in the mass analyzer. This collisional focusing is not seen when the ions are continually generated and allowed to enter the multipole and immediately mass analyzed. The time element allotted for collisional focusing allows a greater ion intensity than would otherwise be seen.

BRIEF DESCRIPTIONS OF THE FIGURES

FIGS. 3*a* and 3*b* list components of the mass spectrometers of the present invention.

Figure 4:
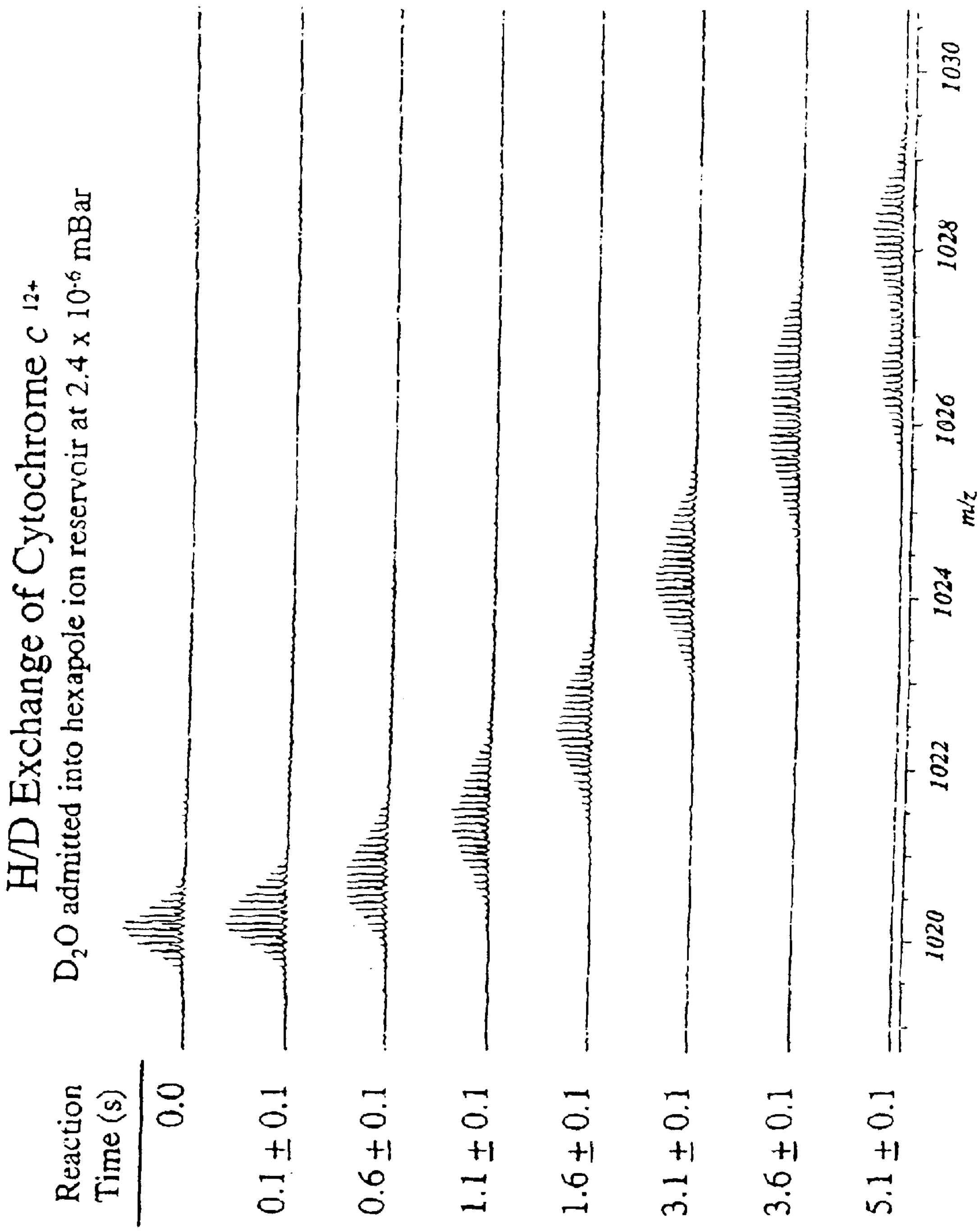

FIG. 4 contains a spectra showing the time course of H/D exchange for the $[M+12H^+]^{12+}$ ions of cytochrome c followed using ESI-FTICR MS. Times are indicated next to the respective spectra. The indicated pressure of $D_2O$ in the source region of the vacuum chamber was ~$2.4\times10^{-6}$ mBar while the effective partial pressure of $D_2O$ at the terminus of the capillary inlet (i.e. in the hexapole) is likely significantly higher.

Figure 5:
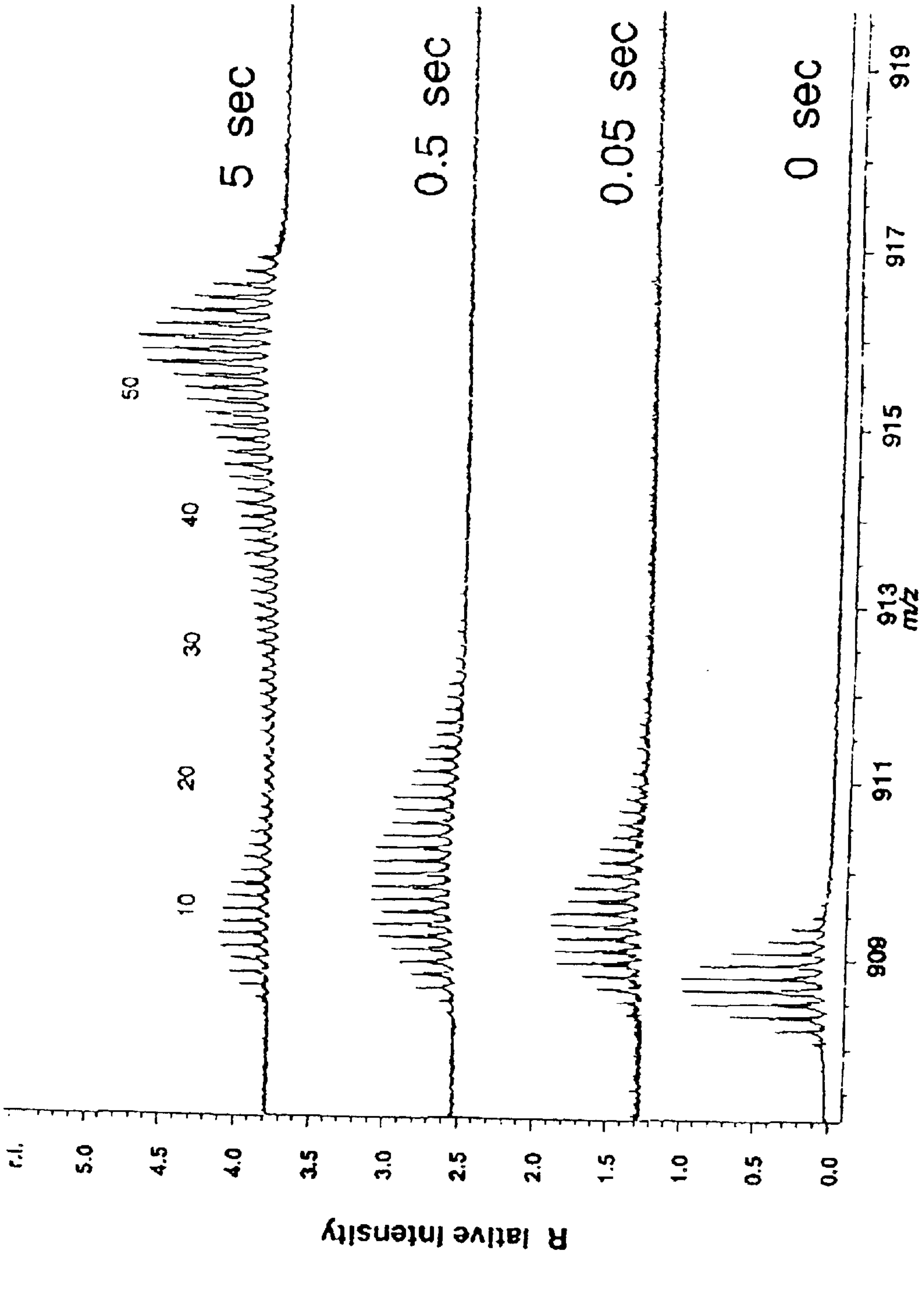

FIG. 5 contains a spectra showing the time course of H/D exchange for the $[M-7H^+]^{7-}$ ion of oligo 1, a 20-mer phosphorothioate oligonucleotide, with $D_2O$ followed using ESI-FTICR MS. The H/D exchange times are indicated above the respective spectra. The positions of the signals for ions with 10, 20, 30, 40 and 50 H/D exchanges has been highlighted in the 5 sec. spectra. For all exchange times, the indicated partial pressure of $D_2O$ gas was ~$2\times10^{-6}$ mBar.

Figure 6:
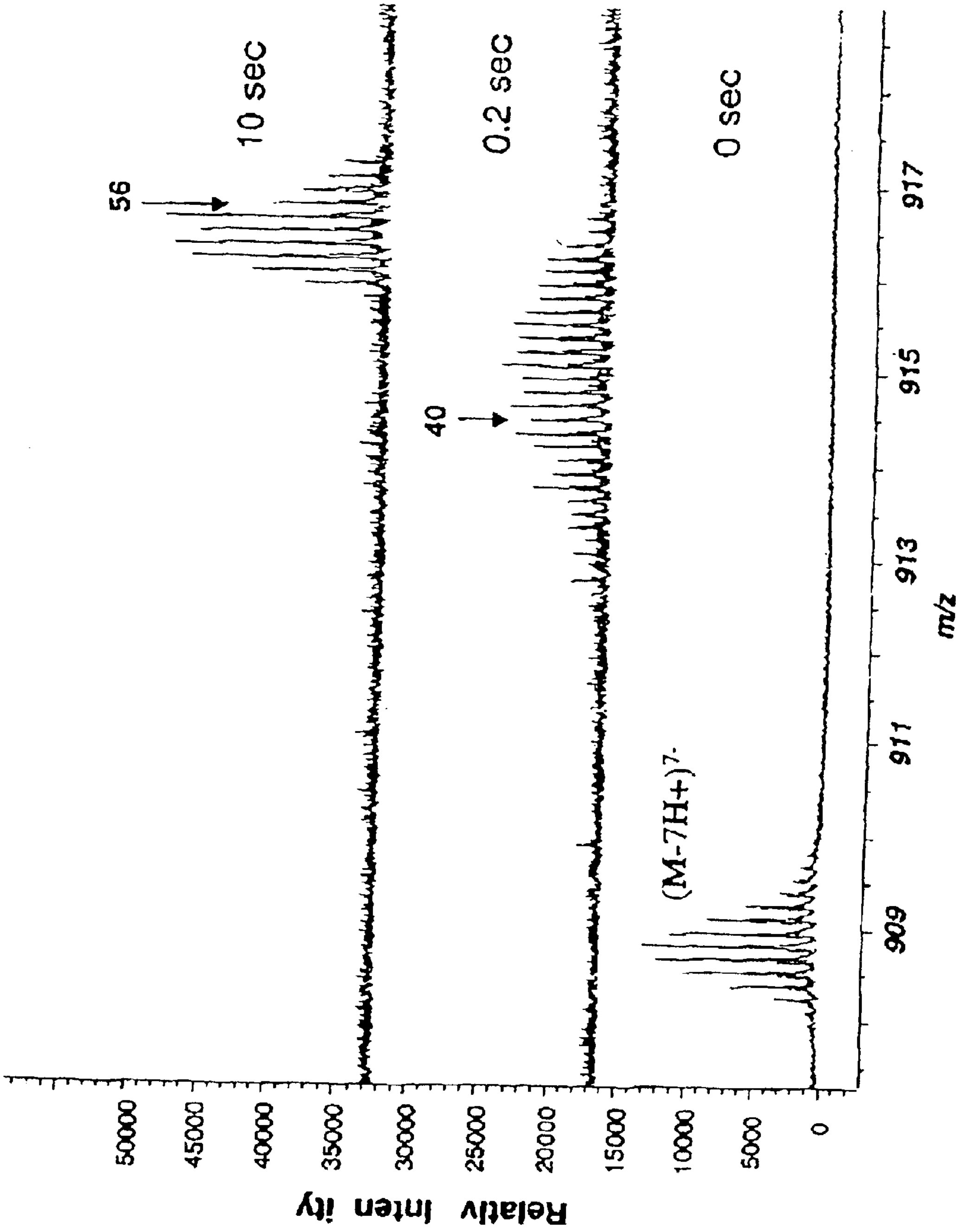

FIG. 6 contains a spectra showing the time course of H/D exchange for the $[M-7H^+]^{7-}$ ion of oligo 1 with $ND_3$ followed using ESI-FTICR MS. The H/D exchange times are indicated above the respective spectra. The locations of the most abundant isotopic signals for ions with 40 and 56 H/D exchanges has been highlighted in the 0.2 and 10 sec spectra. For all exchange times, the indicated partial pressure of $ND_3$ gas was ~$6\times10^{-5}$ mBar.

Figure 7:
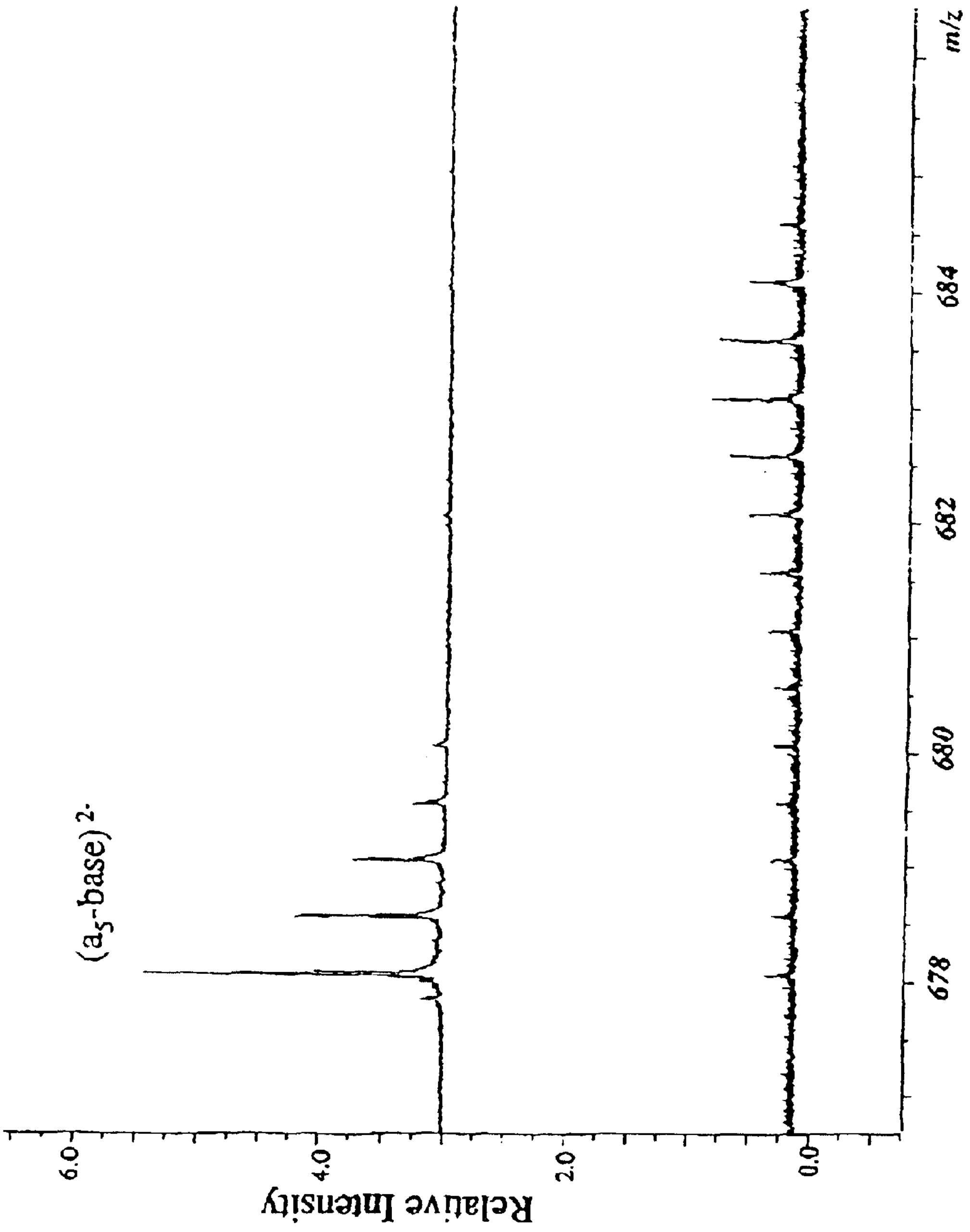

FIG. 7 contains a spectra for the region of the MS/MS spectrum from m/z 676 to 686.5 obtained following 25 msec of high-power IRMPD on intact ions of oligo 1 that have undergone 0 sec and 5 sec of preliminary H/D exchange, respectively.

Figure 8:
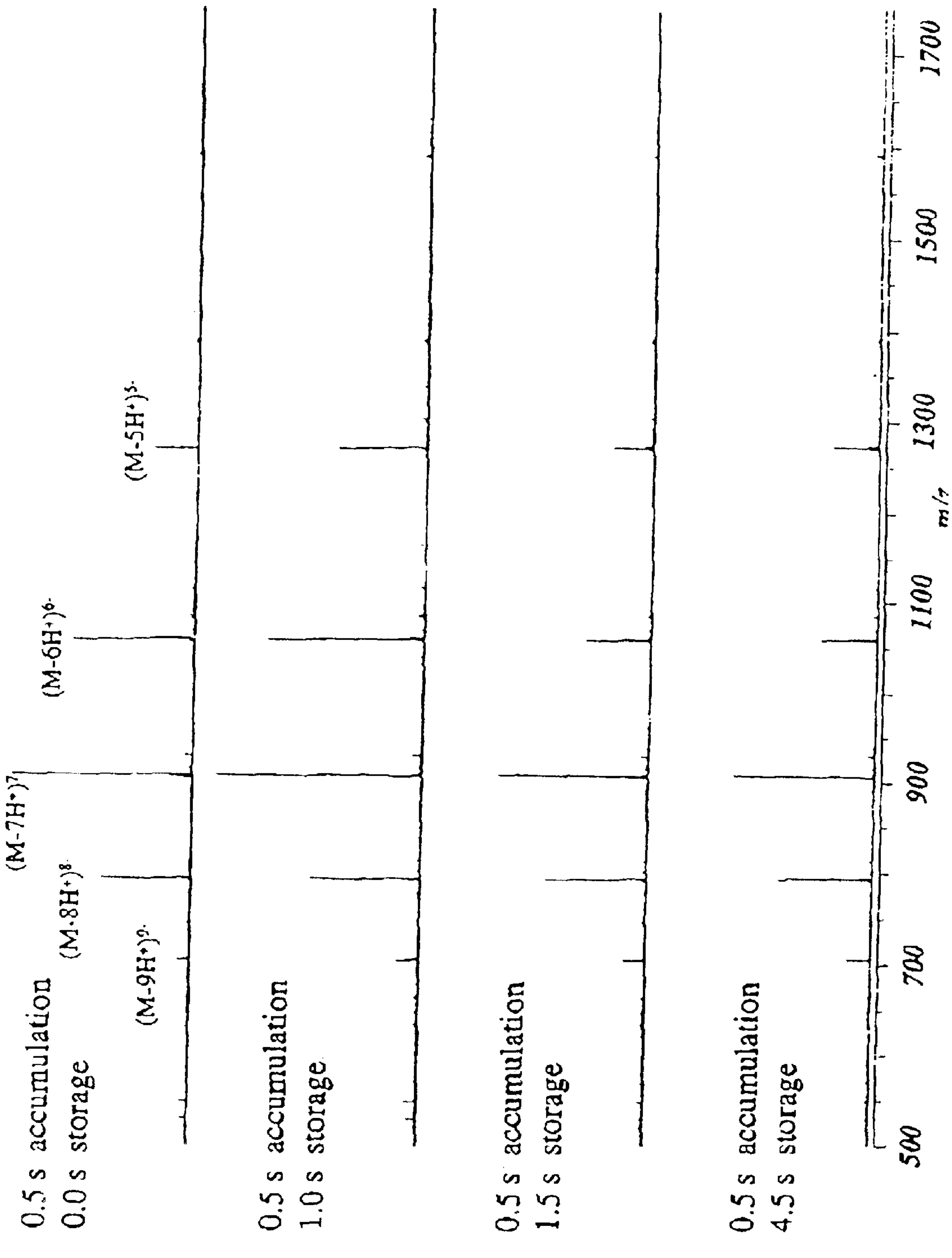
Figure 9:
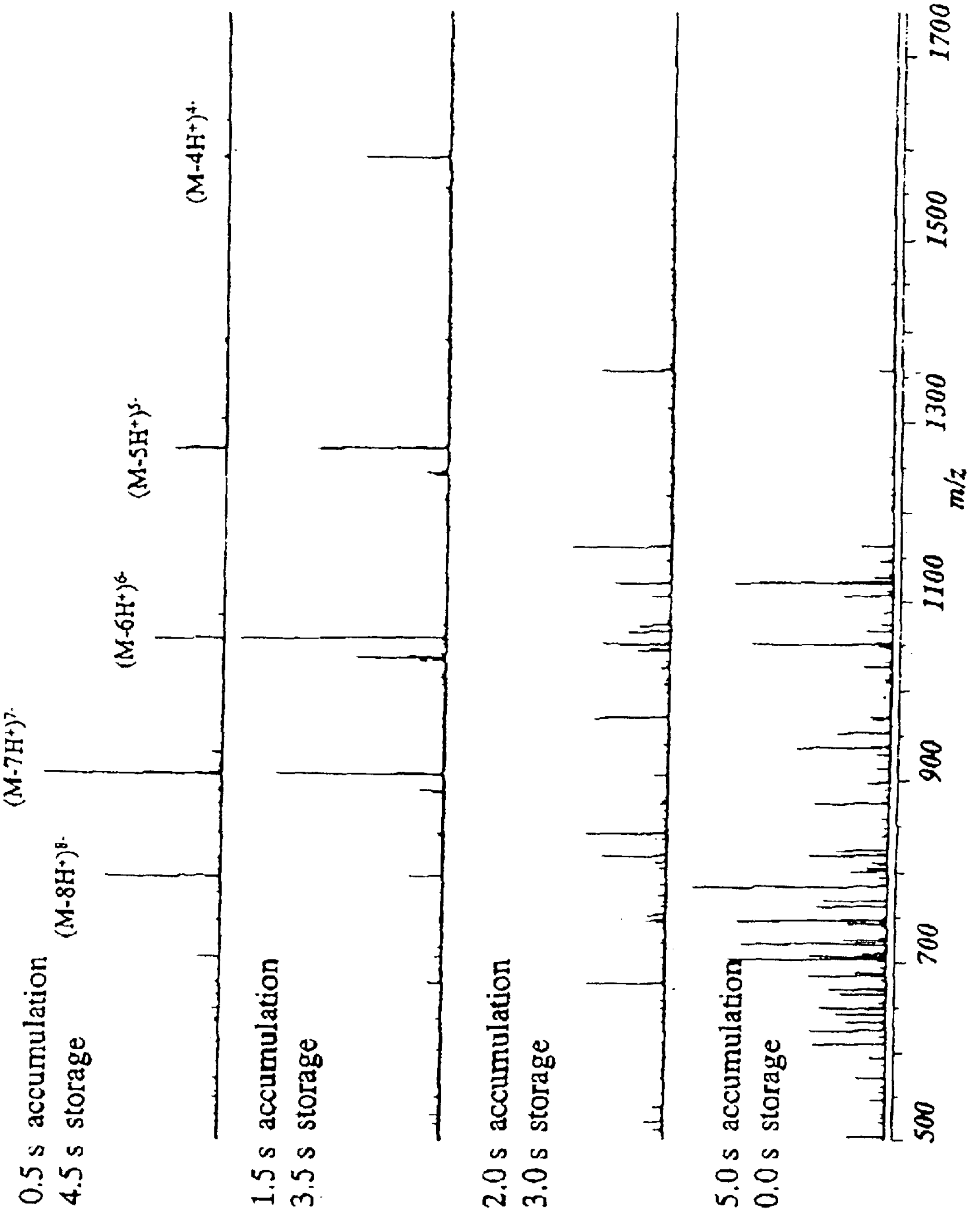

FIGS. 8 and 9 are spectra showing the effect of ion storage and ion accumulation interval on MSAD of 17 $\mu$M oligo 1 employing a $\mu$-ESI source equipped with a shutter of the invention. The spectra in FIG. 8 were acquired with a fixed 500 ms ion accumulation interval followed by increasing storage times in the external ion reservoir. The spectra in FIG. 9 were acquired under identical conditions except the shutter was triggered to the open position for increasing intervals allowing a larger ion population to be accumulated in the external ion reservoir. The sum to the ion accumulation interval and post-accumulation storage intervals are the same for analogous time points in FIGS. 8 and 9. Extensive MSAD is observed when extended ion accumulation intervals are employed but not when short ion accumulation intervals are employed, even if followed by extended ion storage intervals.

FIG. 10 is a table, Table 1, showing the maximum number of H/D exchanges for observed fragment ions of oligo 1 after 2 sec at $2\times10^{-6}$ mBar $D_2O$ and 25 msec of IRMPD.

DETAILED DESCRIPTION OF PREFERRED EMBODIMENTS

Mass spectrometry has emerged as an important technique for analysis of large biomolecules and their complexes, predominantly for measurement of molecular mass and determination of primary sequence. Recent applications have demonstrated the value of mass spectrometry for characterization of many molecular interactions including but not limited to non-covalent complexes between enzymes and substrates, proteins and ligands, and both proteins and nucleic acids with drugs. Determination of the conformation and dynamics of these ions in the gas phase is of interest for many reasons. For many non-covalent complexes, the gas-phase binding properties measured using mass spectrometry mimic the solution properties. A more detailed analysis of the ions would provide insight into the roles hydrogen bonds, electrostatic interactions, and hydrophobic interactions play in stabilizing such complexes. In addition, the effects of solvation on macromolecular structure are difficult to determine experimentally or computationally. Hydrogen/deuterium (H/D) exchange, which can be performed in solution or the gas phase, has been used to study the accessibility of O, S, and N-bound hydrogen atoms in peptides, proteins, nucleotides, and oligonucleotides. The H/D exchange rates for amino, amide, and hydroxyl protons depend on the conformation, charge state, and internal structure of the ions. Measured H/D exchange rates have been correlated with the external or internal locations of the hydrogen atoms and location of charged sites, and agree well with determinations performed in solution.

The H/D exchange process for proteins and nucleic acids with deuterium oxide is believed to require a charged surface residue and a hydrogen donor group. H/D exchange for small oligonucleotide anions is slowed further by internal hydrogen bonds that provide conformational stability. Collisional activation of the anions results in disruption of internal hydrogen bonds and allow $D_2O$ molecules access to both the charged phosphate residues and hydrogen donor groups on the bases and sugars. To date, the slow exchange rates and the lack of information on the sites of exchange have limited the utility of H/D exchange as a probe of oligonucleotide structure in the gas phase. While increased partial pressures of $D_2O$ will enhance the exchange process, concomitant increases in the magnetron motion of ions stored for long periods at high pressure in FT-ICR mass spectrometers reduces sensitivity at commonly employed magnetic field strengths.

Utilizing the methods and apparatus of the invention, significantly faster rates of H/D exchange as well as other ion-molecule reactions can be realized by directing a flow of reactive gas into an ion reservoir. Ions stored in the reservoir can undergo H/D exchange for $\geqq$60 see without significant fragmentation or reduction in ion abundance. The number of labile hydrogen atoms in a protein or nucleic acid can be determined rapidly, providing information on the folding of proteins or the base pairing in structured nucleic acids. The exchanged ions can be transferred into the trapped ion cell for additional analysis and/or irradiated with a laser, e.g., $CO_2$ laser, to effect dissociation, allowing determination of the extent of exchange at each residue. This is directly applicable to studies of other ion-molecule reactions and can be used with various types of mass analyzers compatible with a pulsed ion source including quadrupole ion traps and time-of-flight detectors.

Electrospray ionization (ESI) has found wide acceptance in the field of analytical mass spectrometry. ESI is a gentle ionization method which produces multiply charged ions from large molecules with little or no fragmentation and promotes them into the gas phase for direct analysis by mass spectrometry. ESI sources operate in a continuous mode with flow rates ranging from <25 nL/min to 1000 $\mu$L/min. The continuous nature of the ion source is well suited for mass spectrometers which employ the m/z scanning, such as quadrupole and sector instruments, as their coupling constitutes a continuous ion source feeding in a nearly continuous mass analyzer. However, there are certain hurdles to overcome when coupling a continuous ionization source with a mass analyzer inherently suited to analyze ions from a pulsed ionization source, such as time of flight or ion trap mass spectrometers.

Attempts have been made by others to produce pulsed electrospray devices but these suffer from initially large droplet formation and a time delay for optimal droplet size to occur. Prior to this invention, the most common solution to the apparent mismatch between a continuous ion source and a pulsed-ion mass analyzer was to treat the continuous ion source as a pulsed ion source. By taking a narrow slice of the continuous ion beam during a brief ion sampling interval the mass analyzer is periodically presented with a pulse of ions. This is generally accomplished by electrostatically gating the ion beam into the mass analyzer. During other events of mass spectral acquisition, the ion beam is not allowed to enter the mass analyzer and is not analyzed. This mode of operation can have deleterious effects for online separations if the eluting analyte peak widths are narrow in-time compared to the overall spectral acquisition interval.

When the solvated ions generated from electrospray ionization conditions are introduced into the mass spectrometer in a continuous manner, the ions are subsequentially desolvated in an evaporation chamber and are collected in an rf multi-pole ion reservoir (ion reservoir). A gas pressure around the ion reservoir is reduced to $10^{-3}$–$10^{-6}$ torr by vacuum pumping. The ion reservoir is preferably driven at a frequency that captures the ions of interest and the ensemble of ions are then transported into the mass analyzer by removing or reversing the electric field generated by gate electrodes on either side of the ion reservoir. Mass analysis of the reacted or dissociated ions are then performed.

The continuous introduction of solvated ions into a mass spectrum by an electrospray plume has several drawbacks. The continual spraying of the electrostatic plume requires increased maintenance of the instrument and subsequent downtime so that the inlet can be cleaned of contaminants for optimal performance. Higher flow rates (1 mL/minute) are typically utilized in a liquid chromatography (HPLC) separation of analytes and when utilized in conjunction with an ESI source, the overload of solvent adversely affects the pressure in the mass analyzer.

While a number of factors determine the degree of dissociation observed in continually accumulating ions, it is clear that the space charge in the ion reservoir is of primary importance. A mode of ion dissociation based on coulombic interactions becomes dominant at high ion concentrations in the ion reservoir resulting in extensive fragmentation of the ions. The continual influx of ions into the mass spectrum also affords a range of ions available for subsequent reactions. When the ion-molecule reaction rates are slow compared to the introduction of new ions into the mass spectrum, the mass analyzer displays a continuum of reaction products. Performing IRMPD during the external ion accumulation event means that ions accumulated in the ion reservoir can experience a range of irradiation intervals if the laser is activated concurrent with ion injection. For example, in a 500 ms accumulation/dissociation interval, an ion trapped within the first 10 ms of the event will have the opportunity to be irradiated for nearly 500 ms while an ion trapped near the end of the event may be exposed to the laser beam for only a few milliseconds.

The present invention provides methods and apparatuses that solve many of the problems of prior art methods and apparatuses. The present invention provides for selectively accumulating ions external to a mass analyzer of a mass spectrometer prior to mass spectrometric analysis. Utilizing the methods and apparatuses a population of ions are generated and selectively accumulated in an ion reservoir. Subsequently ion-molecule reaction, ion-ion reaction or dissociation of the ions by application of coherent radiation prior is practiced prior to analysis in a mass analyzer of a mass spectrometer. Prior to mass analysis, the ions can undergo an ion-molecule reaction with a reactive gas such as $D_2O$ or $ND_3$ or undergo dissociation by application of coherent radiation from an infrared laser. The collected ions can be dissociated by application of CID or IRMPD fragmentation.

The application of mass spectrometry for solving increasingly complex analytical and structural characterization problems have expanded with the application of ion-molecule reactions. Because gas phase reactions are frequently fast and efficient, the use of ion-molecule reactions provides a diverse frontier for extending the boundaries of mass spectrometry. Product distributions from ion-molecule reactions may provide key diagnostic information for structure identification, and particular product ions may afford more structurally informative fragmentation patterns than those patterns of ions that are generated by conventional methods. Applications range from those areas involving the development of novel chemical ionization reagents that show structural specificity upon reactions with analyses, to those areas in which ion-molecule reactions are combined with collisionally activated dissociation in unusual sequences to those areas involving ion-molecule reactions of species formed by laser desorption or electrospray ionization. In electrospray ionization applications, the use of ion-molecule reactions allows the concentration of ion current into fewer multi charged ions, permits the counting of acidic of basic sites, and provides indirect information about protein structures and thermochemical data about individual sites in large molecules (Brodbelt, Mass Spectrometry Reviews, 1997, 16, 91–110).

Some examples of ion-molecules that are known in the art include, but are not limited to, H/D exchange ($D_2O$, $ND_3$, $CH_3OD$ or any other deuterated solvent), H/D exchange followed by IRMPD to map the site of exchange, charge exchange reactions (acids, such as acetic acid, trifluoroacetic acid, and bases, such as ammonia, dimethylamine, trimethylamine, N,N,N',N'-tetramethyl-1,8-naphthalenediamine), charge site mapping reactions (hydroiodic acid), and endothermic ion-molecule reactions, for example, for dissociation of biomolecules (ammonia, dimethylamine, trimethylamine).

Additional examples of ion-molecule reactions include, but are not limited to, atomic/molecular gases ($O_2$,$N_2$,$H_2$), elemental hydrides ($EH_n$, for example, $CH_4$, $NH_3$, $H_2O$, HF, $SiH_4$, $PH_3$, $H_2S$, HCl), elemental fluorides ($Ef_n$, for example, $SF_6$,$CF_4$), alkanes(for example, methane, ethane, propane, butane, heptane, hexane), elemental oxides (for example, $CO_2$, $H_2O_2$, $N_2O$, NO, $NO_2$, $N_2O_3$), alcohols (for example, methanol, ethanol, proponal and isopropanol), solvents and chlorinated solvents (for example, acetonitrile, acetone, chloroform, dichloromethane, and any $CH_nX_y$ where X is a group VII element(F,Cl,Br,I,At) and n+y=4, and crown ethers(for example, 12-crown-4, 18-crown-6). Other specific examples of ion-molecule reactions include, but are not limited to, reactions with methyl isobutyrate, pentafluoropropionic anhydride, benzenethiol, furan, acrylonitrile and n-propylamine.

In an embodiment of this invention, the ion source is electrospray ionization by a direct infusion of solutions or the output of a liquid chromatographic separation of analytes, the ion reservoir is an rf multipole ion reservoir and the coherent radiation is applied by a laser. The apparatuses of the invention may be self-contained units that are capable of being retrofitted to many types of mass spectrometers or may be complete mass spectrometers in themselves. These methods and apparatuses can be used for the analysis of singly or multiply charged ions of peptides, proteins, carbohydrates, oligonucleotides, nucleic acids, and small molecules as prepared by combinatorial or classical medicinal chemistry.

The coherent radiation used in the invention interacts with the molecular ions to dissociate them into fragments. Any coherent radiation source can be used with the invention provided the molecular ions absorb photons at the wavelength emitted by the coherent radiation source. The preferred coherent radiation of the invention is emitted by a laser. Infrared lasers, operating from 1 to about 12 mm, both continuous wave (CW) and pulsed, are amenable to the invention. Ultraviolet lasers, operating from about 150 to 400 nm, generally pulsed, are also amenable to the invention. In a preferred embodiment the laser operates at a wavelength in the infrared region. Typical lasers that may be used in the invention include $CO_2$ lasers, CO lasers and Nd-YAG lasers.

In the present invention, ions of interest are first generated using conventional ionization techniques. Ionization of molecules results in charged particles that can be manipulated by electrostatic potentials. Many ionization methods used with mass spectrometry are amenable to the invention. These include electrospray ionization (ESI), chemical ionization (CI), MALDI, laser desorption ionization (LDI), fast atom bombardment (FAB), electron ionization (EI), thermospray ionization, secondary ion mass spectrometry (SIMS), liquid SIMS, field desorption (FD), and $^{252}Cf$ desorption. See, Constantin and Schnell, *Mass Spectrometry*, Ellis Horwood, N.Y., 1990. Other types of ionization methods are also amenable to the present invention.

In the present invention, the ions generated from the electrospray ionization may be desolvated in the ion reservoir. The ions can be desolvated by either a shaking of the water out of the solvated ion-complex or by application of a laser which thermally excites the ion-solvent complex and affords the desolvated ions. The elimination of the solvent evaporation chamber may afford a means for miniaturization of the mass spectrometer.

Figure 1:
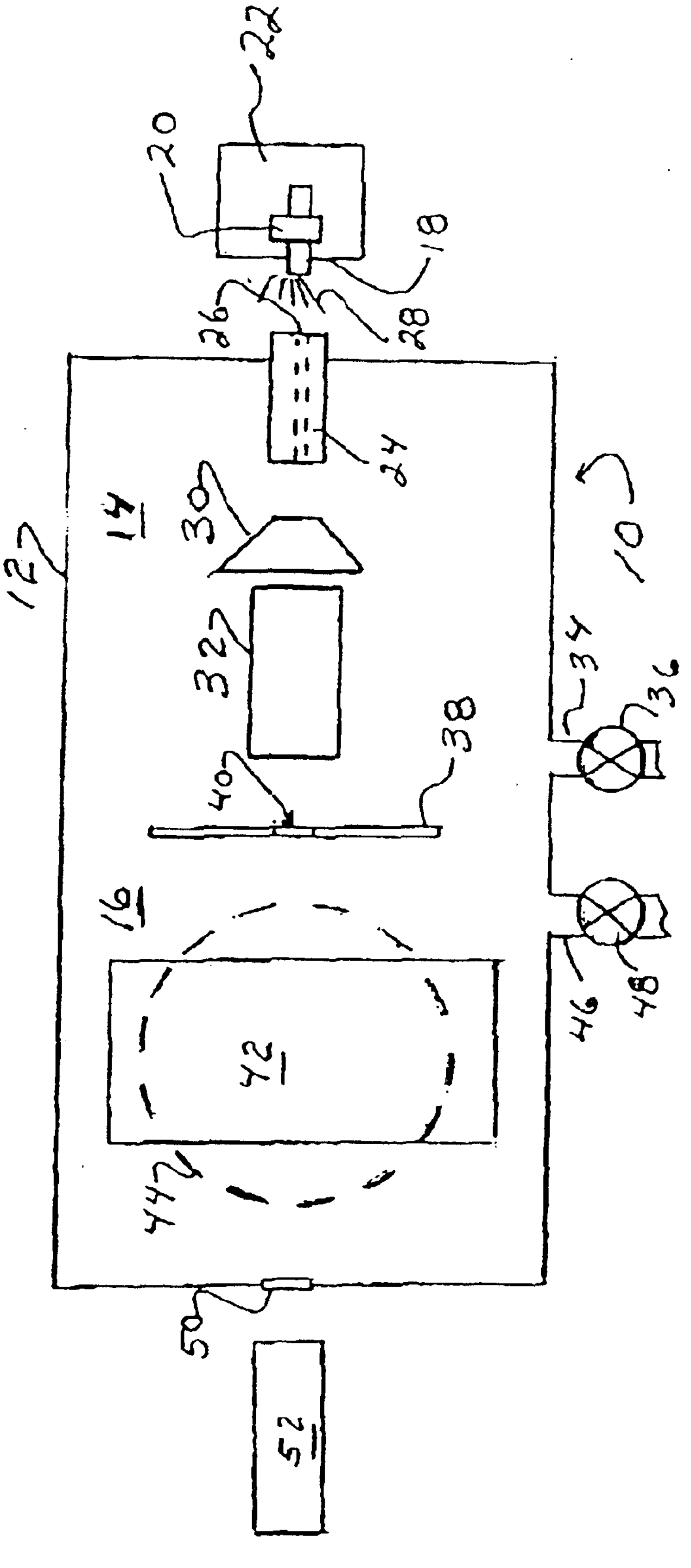
FIG. 1 is a schematic representation of a mass spectrometer and an associated laser.

Seen in FIG. 1 is a representation mass spectrometer 10. A review of the representation mass spectrometer 10 will facilitate understanding of the invention as it includes various component parts that may be included in one or more of the various types of different mass spectrometers. The spectrometer 10 includes a vacuum chamber 12 that is segmented into a first chamber 14 and a second chamber 16. The mass spectrometer 10 is shown as an electrospray mass spectrometer. A metallic micro-electrospray emitter capillary 18 having an electrode 20 is positioned adjacent to the vacuum chamber 12. The electrode/metallic capillary serves as an ion emitter. The capillary 18 is positioned on an X-Y manipulator for movement in two planes.

Adjacent to the capillary 18 and extending from the vacuum chamber 16 is an evaporative chamber 24 having a further capillary 26 extending axially along its length. The X-Y manipulator allows for precise positioning of the capillary 18 with respect to the capillary 26. A plume 28 of ions carried in a solvent are emitted from the emitter capillary 18 towards the evaporator capillary 26. The evaporator capillary 26 serves as an inlet to the interior of vacuum chamber 12 for that portion of the plume 28 directly in line with the evaporator capillary 26.

Within the first chamber 14 is a skimmer cone 30. In line with the skimmer cone 30 is an ion reservoir 32. A port 34 having a valve 36 is connected to a conventional first vacuum source (not shown)for reducing the atmospheric pressure in the first chamber 14 to create a vacuum in that chamber. Separating chambers 14 and 16 is a gate electrode 38.

The ion reservoir 32 can be one of various reservoir such as a hexapole reservoir. Ions, carried in a solvent, are introduced into chamber 14 via the evaporator capillary 26. Solvent is evaporated from the ions within the interior of capillary 26 of the evaporator chamber 24. Ions travel through skimmer cone 30 towards the electrode 38. By virtue of their charge and a charge placed on the electrode 38 the ions can be held in the reservoir.

The electrode 38 includes an opening 40. Ions are released from the ion reservoir 32 by modifying the potential on the electrode 38. They then can pass through the opening 40 into the second vacuum chamber towards a mass analyzer 42. For use in FTICR, positioned with respect to the analyzer 42 is a magnet 44 shown schematically as a dotted circle. The second vacuum chamber 16 includes port 46 having a valve 48. As with the valve 36, valve 48 is attached to an appropriate vacuum pump for creating a vacuum in chamber 16. Chamber 16 further includes a window or lens 50 that is positioned in line with a laser 52. The laser 52 can be used to excite ions in either the mass analyzer 42 or the ion reservoir 32.

Figure 2:
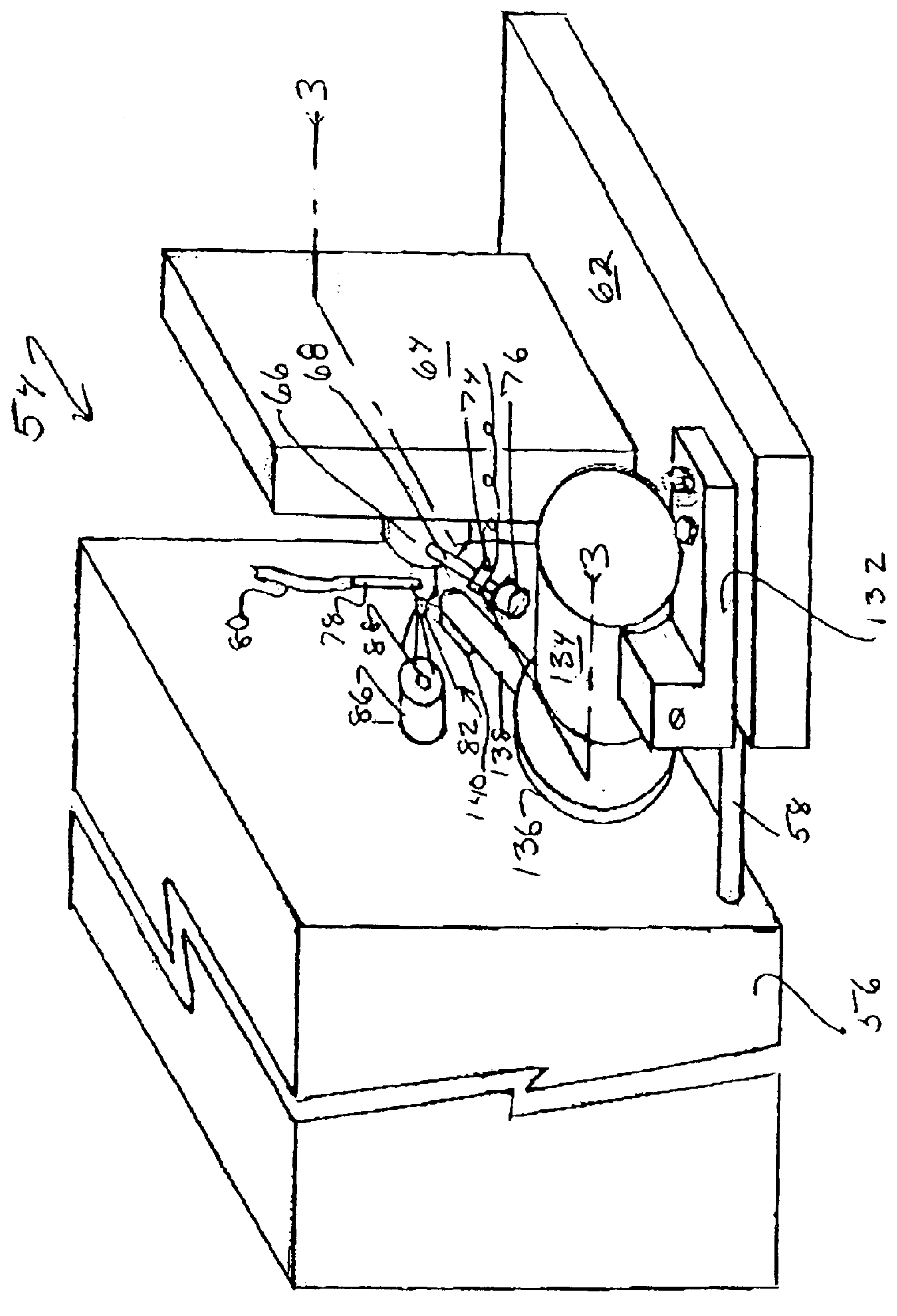
FIG. 2 is an isometric view of the inlet of an electospray mass spectrometer modified to include an external electrospray shutter of the invention shown in the open position.
Figure 3:
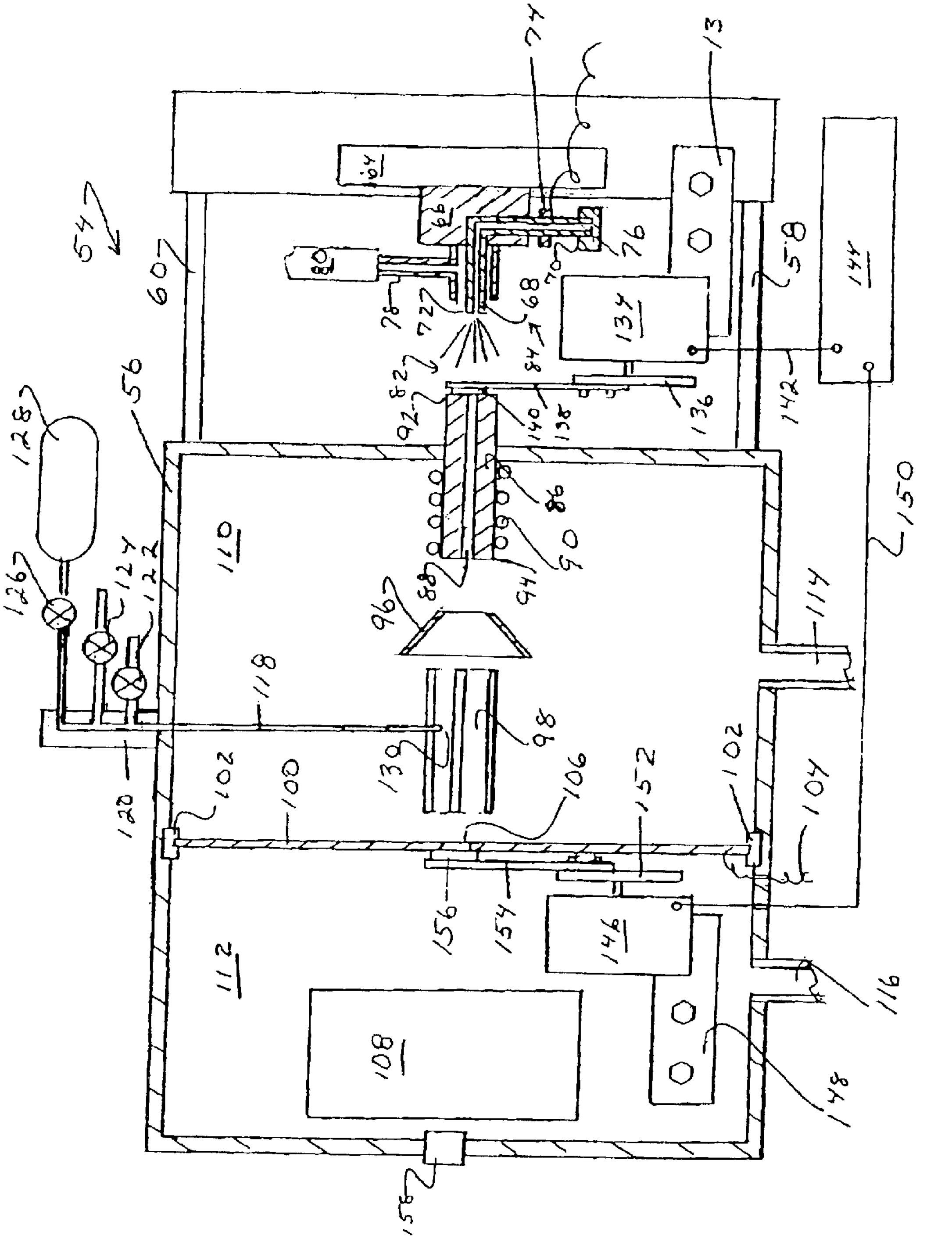
FIG. 3 is a plan view, in partial section, of portions of an electrospray mass spectrometer that incorporates a shutter of the invention.

Referring now to FIGS. 2 and 3, an improved mass spectrometer 54 of the invention is illustrated. As with the representational mass spectrometer 10, the mass spectrometer 54 is also shown as an electrospray mass spectrometer. This is for illustration only as it is understood that the methods and apparatus of the invention are capable of being utilized with a variety of other types of mass spectrometers.

The mass spectrometer 54 includes a vacuum housing 56. Projecting from the vacuum housing 56 are support rods 58 and 60. Attached to the support rods 58 and 60 is a support member 62. An X-Y manipulator 64 is mounted to support member 62. Positioned on the manipulator 64 is an emitter housing 66. A micro-electrospray capillary 68 extends from the housing 66. The capillary 68 has a hollow interior that extends from the receiving end 70 of the capillary to the emitting end 72. This capillary may be formed of a metallic material so as to be electrically conductive or formed of fused silica. An electrode 74 is clamped to the capillary 68 for imparting charge to the capillary. The receiving end 70 of the capillary 68 is illustrated with a septum 76 located on it. Various other apparatus could also be attached to the receiving end 70 of the capillary 68 for receiving a solvent solution having molecules of interest dissolved therein. The septum 76 allows for injection of a solvent solution directly into the hollow interior of the capillary 68.

Surrounding the capillary 68 is a gas discharge manifold 78. An appropriate gas supply line 80 is connected to the manifold 78 for supplying gas to this manifold. Together the capillary 68, manifold 78 and electrode 74 form an injector ion source 84. A solvent containing a sample of interest is injected into the capillary 68. The electrode 74 is biased at an appropriate voltage, e.g., + or −5000 v and an appropriate gas, e.g., $O_2$ for anions, $N_2$ for cations, is supplied to the manifold 78 to create a plume 82 of charged ions suspended in the solvent that is emitted from the ion source 84. This plume is directed from the ion source 84 toward the housing 56.

An inlet tube 86 extends from the interior of the housing 56 towards the ion source 84. It includes an inlet capillary 88. The tube 86 may include a heating coil 90 for heating the tube 86 to assist in solvent evaporation. The emitting end 72 of spray capillary 68 of the ion source 84 is positioned in line with the exterior end 92 of the inlet tube 86 directly in line with the capillary 88 by adjusting the position of the ion source with the X-Y manipulator. When so positioned, the plume 82 is directed towards the inlet capillary 88. Some of the solvent/ion mixture in the plume 82 enters the capillary 88 and the solvent is evaporated off within the capillary 88 leaving the ions to exit from the interior end 94 of the inlet tube 86.

Within the interior of the vacuum housing 56 is one or more skimmer cones (only one, skimmer cone 96, is shown). The skimmer cone 96 is in line with an ion reservoir 98. The ion reservoir can be one of several types of devices. For the purposes of illustrating the invention, the ion reservoir 98 is selected as a hexapole. Adjacent to the ion reservoir 98 is a gate electrode 100. It is seated in the wall of the housing 56 within an insulating ring 102. An electrical lead wire 104 is attached to the electrode for biasing the gate electrode 100. The gate electrode includes an opening 106. Further located in the interior of the housing 86 is a mass analyzer 108. A window 110 is positioned in the wall of the housing 56. Typically the window 110 would be made of a material such as barium fluoride.

The window 110, the center of the mass analyzer 108, the opening 106, the ion reservoir 98 and the skimmer cone 96 are all axially aligned with the capillary 88 in the inlet tube 86. Not shown in FIGS. 2 and 3, but in a manner as described for the representational mass spectrometer 10 of FIG. 1, would be an appropriate laser. It would be positioned in association with the window 110 such that a laser beam can be directed into the interior of the housing 56 for exciting ions within the mass analyzer 108 or the ion reservoir 98.

The gate electrode 100 positioned in the seal 102 divides the interior of the housing 56 into two chambers, a first vacuum chamber 110 and a second vacuum chamber 112. Connected to vacuum chamber 110 is a manifold 114 that is joined to an appropriate vacuum source (not shown) for creating a vacuum within the chamber 110. Connected to chamber 112 is a manifold 116 that is joined to a further appropriate vacuum source (not shown) for creating a vacuum within the chamber 112.

Extending through the wall of the housing 56 to the interior of the chamber 110 is a gas transfer line 118. Typically it would be made of fused silica. Gas transfer line 118 connects to a manifold 120 that further includes a leak valve 122, roughing valve 124, supply valve 126 and supply vial 128. Typically, supply vial 128, in conjunction with supply valve 126, can be used to introduce gas vapor of a liquid such as $D_2O$ into the line 118 while roughing valve 122 would be used to connect to a gas cylinder, such as a $ND_3$ cylinder, for introducing gas into the line 118. The line 118 terminates at end 130 that is positioned inside of the ion reservoir 98. This allows for direct injection of a reactive chemical agent into ions trapped within the ion reservoir 98.

Connected to support member 62 via support bracket 132 is an actuator 134. Actuator 134 can be selected as a solenoid, a stepper motor or a linear shutter capable of translation or other such device capable of effecting rotation of an actuating disk 136 connected to the actuator 134. Mounted on actuating disk 136 is a shutter arm 138. Fixed on one side of shutter arm 138, is sealing disk 140. Controls lines 142 connect the actuator 134 to an appropriate host computer 144. In response to a signal from the host computer 144, the actuator 134 rotates the disk 136 which in turn moves the shutter arm 138 up or down.

The actuator 134 is positioned on bracket 132 such that the sealing disk 140 fits over the end of capillary 88 on the exterior end of inlet tube 86 when the shutter arm 138 is in its "up" or closed position. When the shutter arm 138 is positioned in its "down" or open position, the sealing disk 140 is moved downwardly away from the end of the capillary 88 to expose the opening of the capillary 88 to the plume 82. Thus the shutter arm 138 serves as a barrier to entry of the plume into the capillary 88 when the shutter arm 138 is closed.

The shutter arm 138 can be metallic. When in the closed position, a stable electrospray plume 82 can be maintained between the ion source 84 and the face of the shutter arm 138. The metalized surface of the shutter arm 138 acts as a counter electrode to the ion source 84 to maintain stable spray conditions while preventing charge particles from entering the capillary 88.

The sealing disk 140 is formed of a material capable of forming a seal with the inlet end 92 of the inlet tube 86. Suitable for such a seal is an elastomeric material. During normal operation of the mass spectrometer 54, the sealing disk 140 seals against the inlet tube 86 to form a vacuum seal to the interior of the chamber 110. Thus the gas load into the chamber 110 is reduced resulting in a beneficial effect upon the vacuum required for mass spectrometer performance.

The shutter arm 138 is positioned "upstream" from the ion reservoir 98. It is capable of effecting events "upstream" from the ion reservoir. By physically interrupting the stream of ions introduced into the ion reservoir 98, it can serve to isolate or segregated a particular population of ions in the ion reservoir 98. Further the sealing disk 140 can effectively modulate the vacuum environment surrounding the ion reservoir 98 by sealing the chamber 110 from the external environment.

Located within the interior of chamber 112 is a further actuator 146 identical in construction with the actuator 134. Actuator 146 is mounted on support bracket 148 within the chamber 112. Actuator 146 connects to the host computer 144 via control lines 150. Actuator 146 includes a actuator disk 152 having a shutter arm 154 attached to it. The shutter arm 154 has a sealing disk 156 facing the opening 106 in the gate electrode 100. The disk 156 is also formed from an elastomeric material and thus can form a vacuum seal against the electrode 100. The shutter arm 154 closes off opening 106 when it is in its up or closed position and opens opening 106 when its is in its down or open position. The shutter arm 154 is positioned "downstream" from the ion reservoir 98. Thus it is capable of both preventing ion movement towards the mass analyzer 108 and modulating the vacuum within chamber 112. When used in conjunction with the "upstream" shutter arm 138, the "downstream" shutter arm 154 allows for modulation of vacuum within the chambers 110 and 112 results.

The "upstream" shutter arm 138 and the "downstream" shutter arm 154 can be actuated independently of one another by the host computer 144. Thus downstream shutter arm 154 can be up in its up, closed position maintaining a vacuum seal within chamber 112 and shutter arm 134 can be opened to allow ion flow into the ion reservoir 98. Having populated the ion reservoir 98 with a population of ions, the upstream shutter arm 138 is then closed sealing the chamber 110. The shutter arm 138 will be open for a time sufficient to populate the ion reservoir 98. Typically this time period will be, for example, from about 0.001 to about 10 seconds to allow a time slice of a population of ions to be accumulated in the ion reservoir 98. A reactant gas can be introduced into the interior of the ion reservoir 98 via the line 108 to effect an ion-molecule or ion-ion reactions with the resident population of ions within the ion reservoir 98. Upon completion of that reactions, the downstream shutter arm 154 is moved to its down or open position and the ion can be moved from the ion reservoir towards the mass analyzer 108 via changing the potential on the gate electrode 100 or via other mechanism known in the mass spectral arts. If it is desired to irradiate the ion population within the reservoir 98 with a laser beam, the shutter arm 154 is opened while retaining the ions in the ion reservoir 98 via the electrical potential on the gate electrode 100 and the ions are irradiated through the window 158.

The ion reservoir 98 may be a quadrupole, hexapole, octapole or other rf-multipole ion reservoir (rf is a shorthand notation for radio frequency). In a rf-multipole, a field is formed by pairs of parallel, electrically conducting rods. Each pair of electrodes is electrically connected. A rf oscillator supplies a positive signal to one electrode in each pair and a signal of opposite charge and equal strength to the other electrode in each pair. Another ion trap based on radio frequency is a Paul trap (Cooks et al., *Acc. Chem. Res.*, 1994, 27, 315). Other possible ion reservoirs include Penning traps (Vartanian et al., *Mass Spectrometry Reviews*, 1995, 14, 1–19), electrostatic lenses, jet expansion and electrostatic ion reservoirs (White et al., *Rapid Comm. in Mass Spec.*, 1996, 10, 1845–1849). The ion reservoir may be used to collect negatively or positively charged ions generated by the ion source. The ion reservoir preferably has a gated electrode to allow the accumulation of ion fragments prior to their mass measurement.

Ions are preferably collected in the ion reservoir in a generally mass-inselective manner. This permits dissociation over a broad mass range, with efficient retention of fragment ions. By "mass-inselective" is meant that ions are not collected based on their mass to charge ratio. Theoretically, all ions are collected regardless of their mass. From a practical standpoint, those skilled in the art will recognize that there are lower and upper limits to the size of ions that are collected. With the limitation of current instruments, this m/z range is from about 50 to about 100,000 m/z. The ion reservoir also provides a spatial separation which results in a more time-efficient method of mass spectrometry. Thus, the dissociation and measurement take place concurrently in spatially distinct regions of the spectrometer. Mass measurement requires lengthy times. Thus, an improved ionization duty cycle results, which enables improved analysis of on-line separations, e.g. capillary electrophoresis (CE), or liquid chromatography (LC). With the methods of the present invention, an accumulation/dissociation efficiency of near unity can be achieved.

The rapid response time of the shutter 138 (<25 ms) allows reproducible, user defined intervals during which ions can be injected into and accumulated. Following injection into the ion reservoir, ions can be stored for extended intervals prior to being transferred to the trapped ion cell for mass analysis. This arrangement allows independent characterization of ion behavior in the ion reservoir as a function of storage time and ion number.

The continual accumulation of ions in a multipole ion reservoir affords a weaker ion intensity as seen in the mass analyzer due to the unfocused nature of the ions. By holding a selected population of ions in the multi-pole for a certain time, for example, from 50 msec to about 200 msec, collisional focusing is allowed to occur resulting in a greater ion intensity as seen in the mass analyzer. This collisional focusing is not seen when the ions are continually generated and allowed to enter the multipole and immediately mass analyzed. The time element allotted for collisional focusing allows a greater ion intensity than would otherwise be seen.

The ions that are accumulated in the ion reservoir are prevented from entering the mass analyzer by a gated electrode. Once a sufficient ion population is accumulated in the ion reservoir and the ions are allowed to react or dissociate, the voltage potential can be shifted or removed to allow the ions to enter the mass analyzer.

In a preferred embodiment of the invention, additional chemistry is performed on this population of ions, including but not limited to ion-molecule reactions, irradiation with a laser beam and dissociation, or collision-induced dissociation. This approach has significant advantages over convenional "in-cell" H/D exchange approaches. The invention allows significantly higher effective pressures of reagent gas to be admitted into the reaction volume without adversely affecting the subsequent mass measurements. The higher effective reagent-gas pressures in the reaction reservoir lead to significantly higher H/D exchange rates and concomitant shorter reaction times. The reaction occurs in a spatially distinct region of the spectrometer and is independent of the ion source and the mass spectrometry platform used to analyze the products of the ion-molecule reactions. Finally, the reaction volume is spatially separated from the detection volume, residual reagent gas in the analyzer region is minimized and does not adversely affect the performance of the mass analyzer.

In certain of the following examples, rapid gas-phase hydrogen/deuterium (H/D) exchange from $D_2O$ and $ND_3$ into oligonucleotide and cytochrome C ions was effected during storage in a hexapole ion reservoir. Deuterated gas was introduced through a capillary line that discharges directly into the low-pressure region of the reservoir. Following exchange, the degree of H/D exchange was determined using FT-ICR mass spectrometry. For cytochrome c, ~96 H/D exchanges were observed after 5 sec. Exchange rates of >250 hydrogens/sec were observed for oligonucleotide ions when $D_2O$ or $ND_3$ was admitted directly into the external ion reservoir owing to the high local pressure in the hexapole. Gas-phase H/D exchange experiments could be conducted more than 100× faster compared to those using conventional in-cell exchange protocols that require lower gas pressures and additional pump-down periods. The short experimental times facilitated the quantitation of the number of labile hydrogens for less reactive proteins and structured oligonucleotides. Partially deuterated oligonucleotide ions were fragmented in the reservoir using IRMPD. The resulting fragment ions show that exchange predominates at charged sites on the 5' and 3'-ends of the oligonucleotide, while exchange is slower in the core. The hardware configuration utilized was independent of the mass detector and should be compatible with quadrupole ion traps and time-of-flight detectors. For use in the present invention, the mass analyzer can be one of various known mass analyzers as described including, but not limited to, mass analyzers based on magnetic means (sector), Fourier transform mass spectrometry (FTMS), time-of-flight, quadrupole, iontrap, linear quadrupole and hybrid instruments.

EXAMPLES

Example 1

Enhanced Gas-Phase Hydrogen/Deuterium Exchange of Oligonucleotide and Protein Ions Stored in a Multipole Ion Reservoir Samples of oligo 1, a 20 mer phosphorothioate oligonucleotide of the sequence GCC CAA GCT GGC ATC CGT CA, SEQ OD NO 1, was prepared using conventional phosphoramidite chemistry and desalted by ethanol precipitation from 1 M $NH_4OAc$. The 5 $\mu$M solution of oligo 1 was prepared in an aqueous solution containing 50% isopropyl alcohol and 0.1% tripropylamine. Cytochrome c (Sigma, St. Louis) was dissolved to 5 $\mu$M in an aqueous solution containing 49% methanol and 2% acetic acid. All mass measurements were performed on an Apex II 70*e* electrospray ionization FT-ICR mass spectrometer (Bruker Daltonics, Billerica) employing an actively shielded 7 Tesla superconducting magnet. Solutions were infused at a rate of 1.5 $\mu$L/min using a syringe pump.

The electrospray source was positioned 1.5 cm away from the metallized terminus of the desolvation capillary biased at ±5000 V. A countercurrent flow of dry gas ($O_2$ for anions, $N_2$ for cations) was heated to 225° C. to assist the desolvation process. Ions were accumulated in an external ion reservoir comprised of an RF-only hexapole, a skimmer cone, and an auxiliary electrode as described above. Deuterium oxide or $ND_3$ gas was infused directly into the low-pressure region of the hexapole at indicated pressures of $1\times10^{-6}$ to $6\times10^{-5}$ mBar. H/D exchange was facilitated by introducing $D_2O$ gas concurrent and subsequent to, the ion accumulation interval.

A modified micro-electrospray ionization source equipped with an external ion shutter was employed. The computer activated shutter prevented the electrospray plume from entering the inlet capillary unless triggered to the "open" position. When in the "closed" position, a stable electrospray plume was maintained between the ESI emitter and the face of the shutter. When the shutter was triggered, a "time slice" of ions was allowed to enter the inlet capillary and subsequently was accumulated in the external ion reservoir. The rapid response time of the ion shutter (<25 ms) allowed reproducible, user defined intervals during which ions could be injected into, and accumulated in, the external ion reservoir.

Following injection into the reservoir, ions could be stored for extended intervals during which ion-molecule reactions are performed. The described configuration facilitated extended reaction times without promoting fragmentation via MSAD and, because the interval during which ions are injected can be short relative to the ion reaction interval, the low mass "tail" of partially exchanged species was predominantly eliminated. Following a variable ion-molecule reaction interval, ions were transferred into the trapped ion cell, 4–16 transients of 512 k data points were summed and Fourier transformed without zero-filling. IRMPD experiments were performed using a 30 W $CO_2$ laser (Synrad; Bothell, WA) aligned to traverse the ion cell and electrostatic lens elements. The laser was operated at an output of 28 watts as measured at the entrance to the mass spectrometer, no attempt was made to measure the actual laser power in, or beyond, the hexapole ion reservoir. All aspects of pulse sequence control, data acquisition, and post processing employed a Bruker Daltonics datastation running XMASS version 5.0 on a Silicon Graphics (San Jose, Calif.) R5000 computer.

The ion reservoir consisted of an rf-only multipole bounded by electrostatic elements. It was used as an external ion reservoir in which ions are accumulated in a relatively high pressure region ($5\times10^{-7}$ to $>1\times10^{-}$torr) prior to being transferred to the FTICR cell where they can be detected at low pressure ($<5\times10^{-9}$ mBar). The hexapole ion reservoir was adapted for H/D exchange by fitting a 200 $\mu$m i.d. fused silica capillary through a hole drilled in one of the rod support elements such that the gas exiting the capillary is introduced directly into the external ion reservoir. We refer to this configuration as an external reaction-reservoir.

For the introduction of $D_2O$, the capillary line was attached to a leak valve and a vial of $D_2O$ liquid. The $D_2O$ is degassed through multiple freeze-pump-thaw cycles via a "tee" attached to a rotary vacuum pump. Indicated partial pressures of 1–6×$10^{-6}$ mBar $D_2O$ can be introduced into the region around the ion reservoir. Alternatively, $ND_3$ was introduced from a lecture bottle via the leak valve. Even though the effective partial-pressures of $D_2O$ or $ND_3$ at the exit of the gas inlet capillary is likely orders of magnitude higher than indicated at the cold cathode gauge, the base pressure in the trapped ion cell is not affected. The low pressure side of the hexapole was positioned directly over the throat of a 500 l/s turbomolecular pump with the cold cathode gauge mounted on the other side of the turbo pump.

H/D exchange for the $[M+12H^+]^{12+}$ charge state for cytochrome c is shown in FIG. 4. The H/D exchange was performed in the external ion reservoir following a 200 ms ion accumulation interval using the described shutter device. At a $D_2O$ partial pressure of 4×$10^{-6}$ mBar, only 7 H/D exchanges are shown to have occurred after 0.6 sec. However, 92 labile hydrogens have exchanged after 5 sec.

The H/D exchange for the $[M-7H^+]^{7-}$ charge state of oligo 1 with $D_2O$ and $ND_3$ is presented in FIGS. 5 and 6. In a first experiment, the shutter arm is used to select ions from a single peak in an HPLC trace. These ions are accumulated in a multipole ion guide reservoir and dissociated via CID or IRMPD fragmentation. The masses of the fragment ions are determined using the mass spectrometer. In a experiment, the shutter arm is used to select a population of ions, which are allowed to react in the ion reservoir with molecules of gas phase reagent such as $D_2O$ or $ND_3$ so as to effect H/D exchange at sites with a labile hydrogen atom.

For oligo 1 and $D_2O$ as seen in FIG. 5, ions where accumulated for 200 msec and allowed to react with $D_2O$ for 0.05, 0.5, and 5 sec, respectively.

As seen in FIG. 6, at $ND_3$ pressures of 6×$10^{-5}$ mBar, 40–50 H/D exchanges are observed within 0.225±0.125 sec. After only 10 sec, complete exchange was observed for >85% of the labile proton in the oligonucleotide. The $[M-9H^+]^{9-}$ through $[M-5H^+]^{5-}$ charge states all exchange fully with $ND_3$ after 10 sec. In contrast, the lower charge states of oligo 1 exchange with $D_2O$ more slowly compared to the higher charge states. This result is consistent with a mechanism where exchange with $ND_3$ does not require a proximate charged residue. A comparison of the exchange sites and rates for an oligonucleotide with $D_2O$ and $ND_3$ may allow the gas-phase locations of charges to be identified.

Example 2

H/D Exchange Followed by In-Hexapole Infrared Muli-photon Dissociateion (IRMPD)

The location of H/D exchange was investigated using in-hexapole IRMPD. In this example, ions of oligo 1 (see Example 1) were stored for 5 sec in the presence of $D_2O$ then irradiated at full laser power for 25 msec. A series of $a_3$-B through $a_7$-B ions were observed along with a series of $w_3$-$w_8$ ions. A region of the MS/MS spectrum between m/z 677 and 686 is shown in lower trace in FIG. 7 while the upper trace depicts the same region of the spectrum when the ions have undergone H/D exchange for 5 sec with a subsequent 25 ms laser pulse. The $a_5$-$B^{(2-)}$ ion at m/z 678.061 has exchanged up to 11 hydrogens. The maximum exchange noted for each observed fragment ion is listed in the Table illustrated in FIG. 10.

The relative abundances of all fragment ions were reduced in the exchanged spectrum as the signals were distributed over a manifold of partially exchanged species. Hence, signals were not detected from all charge states or fragment ions in the exchanged spectrum. The observed w-series ions did not exchange all of their labile hydrogens, consistent with a mechanism of formation where a carbon-bound proton is abstracted from the C2' of the 5'-sugar. A $y_7^{(3-)}$ ion is detected without the terminal phosphate which has a signal manifold consistent with exchange of all 18 labile hydrogens. This can be contrasted with the $w_7^{(3-)}$ ion, where only 17 of 19 labile hydrogens have exchanged. The $a_3$-B through $a_5$-B ions have exchanged nearly every labile hydrogen, while the $a_6$-B and $a_7$-B ions undergo little additional exchange. This result is consistent with results previously reported (Robinson et. al., *Int. J. Mass Spectrom*, 1999, 185/186/187, 3566–3571), where it was demonstrated that H/D exchange with $D_2O$ is charge mediated and is consistent with the lack of additional charge on the larger fragment ions. Exchange on 14 of the bases at both termini of the oligonucleotide have been sampled through these fragment ions, and 32 of 40 possible exchanges are observed at these sites. As the intact oligonucleotide exchanged a maximum of 37 protons after 2 sec, these results suggest that only ~5 of 16 possible hydrogens have exchanged from the central 6 nucleotides. Both the reduced fragmentation and reduced extend of H/D exchange are consistent with a reduced number of charges in the central region of the molecule.

The H/D exchange can be combined with IRMPD or CID to map the structure of macromolecules such as RNA, DNA, proteins, and peptides. TRMPD of the partially exchanged oligo 1 in the hexapole reservoir (FIG. 10, Table 1) shows that the predominant exchange of labile hydrogen atoms occurs at the 5' and 3'-ends, rather than in the core of the ions. The external-reservoir gas-phase H/D exchange scheme is equally amenable to the study of proteins. Protein ions are subjected to varying reaction times with $D_2O$ introduced directly into the hexapole ion reservoir at a partial pressure of 2.4x10–6 mBar. The extent of the H/D exchange is quantified by subsequent mass analysis.

H/D exchange of protein ions followed by IRMPD or CID provide insight into what amino acids are located on the surface and which residues are not exposed to the solvent. A comparison of the H/D exchange of non-covalent complexes between small molecules and proteins or nucleic acids would allow binding sites to be mapped at the atomic level using a rapid mass spectrometry method, via measurement of the protection of specific residues from exchange in the complex compared to the H/D exchange in the free protein or nucleic acid.

Example 3

Following injection into the hexapole, ions can be stored for extended intervals prior to being transferred to the trapped ion cell for mass analysis. This arrangement allows independent characterization of ion behavior in the external ion reservoir as a function of storage time and ion number. The spectra shown in FIGS. 8 and 9 illustrate ESI-FTICR spectra of oligo 1 acquired following a 500 ms ion shutter interval with a range of hexapole storage times prior to ion transfer and detection. These spectra demonstrate that ions can be stored in the external ion reservoir for extended intervals without significant deterioration due to CAD. Further molecular ions of interest, e.g., oligonucleotide and peptide ions, can be stored in the external ion reservoir in excess of 30 minutes utilizing this configuration.

In contrast to the spectra shown in FIG. 8, the spectra shown in FIG. 9 were acquired with increasing ion-shutter intervals under otherwise identical conditions (i.e. the sum of the ion injection interval and the ion storage interval are the same for the data sets shown in FIG. 8 and 9). These spectra exhibit a significant degree of multipole storage assisted dissociation (MSAD) at longer ion shutter intervals consistant with a charge mediated dissociation mechanism. The only difference between the conditions under which the spectra in FIG. 8 were acquired and the conditions under which the spectra in FIG. 9 were acquired is the ion injection interval employed. The total experiment times, solution conditions, external ion reservoir configurations, and electrospray parameters are identical between the two data sets. The contrast between the complete lack of disassociation observed for the 500 ms ion-shutter event (FIG. 8), even when extended ion storage intervals are employed, and the extensive MSAD observed with longer ion-shutter events (FIG. 9) is consistent with our hypothesis that MSAD is influenced by the total charge and/or charge density in the external ion reservoir.

The above examples demonstrate that in combination with gating ion flow into a hexapole ion reservoir, rapid H/D exchange can be realized at relatively high partial pressures in the reservoir. The ion-hexapole exchange is compatible with much higher effective pressures of deuterant, which can not be realized at conventional magnetic field strengths without quadrupolar cooling to reduce induced magnetron motion. Following H/D exchange in the hexapole, ions were transferred to the FTICR cell for analysis. Further IRMPD was performed in the hexapole following H/D exchange, and measured differential incorporation of deuterium as a function of position within the molecular ion or interest. The reduced fragmentation and H/D exchange are consistent with a reduced number of charges in the core of the molecular ion. The illustrated external reaction-reservoir scheme is directly applicable to the study of other ion-molecule reactions and, as this approach is MS platform independent, is directly applicable to other MS platforms including quadrupole ion traps and time-of-flight detectors. The range of effective gas pressures attainable with this scheme allows H/D exchange profiles to be generated in a fraction of the time required by conventional in-cell H/D exchange protocols and inherently provides spatial separation between the high pressure ion-molecule reaction.

The invention could be linked to any analytical separation technique such as HPLC, CEC or CE to deliver macromolecules, small molecules or their complexes to the electrospray source. Tn addition to H/D exchange, this approach is amenable to a number of other ion-molecule or dissociation reactions which might be used to probe sequence and structures of gas-phase macromolecules

What is claimed:

1. A system for processing ions, comprising:

an ion source for generating ions within a first space;

a vacuum chamber which forms a second space, said vacuum chamber comprising a gate electrode having an outlet opening and a wall having an inlet opening;

said vacuum chamber being maintained at a lower uressure than said first space so that gas contained within said first space flows from said first space into said vacuum chamber when said inlet opening is unobstructed;

an ion reservoir disposed within said vacuum chamber, wherein said ion reservoir is capable of maintaining ions within said vacuum chamber;

an inlet shutter, wherein said inlet shutter can block said inlet opening to prevent said ions and said gas from entering said vacuum chamber; and an outlet shutter, wherein said outlet shutter can block said outlet opening to prevent ions from exiting said vacuum chamber.

2. The system of claim 1, wherein said ion reservoir comprises at least one of the following: a rf-multipole ion reservoir, an electrostatic lens ion reservoir and a jet expansion ion reservoir.

3. The system of claim 1, wherein said ion reservoir comprises at least one of the following: a Paul ion trap and a Penning ion trap.

4. The system of claim 1, further comprising:

an electrode having an orifice, wherein said electrode is disposed within said vacuum chamber between said inlet opening and said ion reservoir.

5. The system of claim 1, wherein said ion source comprises at least one of the following: an electron impact (EI) ionization source, an electrospray ionization (ESI) source, a chemical ionization (CI) source and a matrix-assisted laser desorption ionization (MALDI) source.

6. The system of claim 1, further comprising:

a gas source having a reactant gas, wherein said gas source is in fluid communicate with said vacuum chamber and wherein, upon the introduction of said reactant gas into said vacuum chamber, at least a portion of said ions maintained within said vacuum chamber react with said reactant gas to form product ions.

7. The system of claim 6, wherein said reactant gas comprises at least one of the following: gaseous molecules and gaseous ions.

8. The system of claim 1, further comprising:

a laser source in operative association with said vacuum chamber, wherein said laser source dissociates at least a portion of said ions maintained within said vacuum chamber to form fragment ions.

9. The system of claim 8, wherein said laser source comprises an infrared laser source.

10. The system of claim 1, further comprising:

an inlet tube having a capillary disposed therethrough, said inlet tube being disposed within said inlet opening of said vacuum chamber.

11. The system of claim 1, wherein said ion reservoir acts as an ion desolvating chamber.

12. The system of claim 1, wherein said ion reservoir acts as an ion collision chamber.

13. The system of claim 1, wherein said inlet shutter includes a seal, and wherein said seal of said inlet shutter can form a fluid-tight seal around said inlet opening between said wall and said inlet shutter.

14. The system of claim 13, wherein said outlet shutter includes a seal, and wherein said seal of said outlet shutter can form a fluid-tight seal around said outlet opening between said gate electrode and said outlet shutter.

15. The system of claim 1, further comprising a mass analyzer for analyzing ions, wherein said mass analyzer is located downstream of said vacuum chamber.

16. The system of claim 15, wherein said mass analyzer comprises at least one of the following: a magnetic sector mass analyzer, a Fourier transform mass spectrometry mass analyzer, a time-of-flight mass analyzer, a multipole mass analyzer or an ion trap mass analyzer.

17. The system of claim 1, further comprising:

a first actuator coupled to said inlet shutter, wherein said first actuator is capable of positioning said inlet shutter so as to block said inlet opening; and a second actuator coupled to said outlet shutter, wherein said second actuator is capable of positioning said outlet shutter so as to block said outlet opening.

18. A mass spectrometry system, comprising:

an ion source for generating ions within a first space;

a first vacuum chamber which forms a second space, said first vacuum chamber comprising a gate electrode having an outlet opening and a wall having an inlet opening, wherein said ions can be directed from said first space into said first vacuum chamber via said inlet opening;

said vacuum chamber being maintained at a lower pressure than said first space so that buffer gas contained within said first space flows from said first space into said vacuum chamber when said inlet opening is unobstructed;

an ion reservoir disposed within said first vacuum chamber, wherein said ion reservoir is capable of maintaining ions within said first vacuum chamber;

an inlet shutter, wherein said inlet shutter can block said inlet opening to prevent said ions and said buffer gas from entering said first vacuum chamber;

an outlet shutter, wherein said outlet shutter can block said outlet opening to prevent ions from exiting said first vacuum chamber;

a gas source having a reactant gas, wherein said gas source is in fluid communication with said first vacuum chamber and wherein, upon the introduction of said reactant gas into said first vacuum chamber, at least a portion of said ions maintained within said first vacuum chamber react with said reactant gas to form product ions; and a mass analyzer, wherein said mass analyzer is disposed within a second vacuum chamber.

19. The mass spectrometry system of claim 18, wherein said reactant gas comprises at least one of the following: gaseous molecules and gaseous ions.

20. The mass spectrometry system of claim 18, wherein said ion reservoir comprises at least one of the following: a rf-multipole ion reservoir, an electrostatic lens ion reservoir and a jet expansion ion reservoir.

21. The mass spectrometry system of claim 18, wherein said mass analyzer comprises at least one of the following: a magnetic sector mass analyzer, a Fourier transform mass spectrometry mass analyzer, a time-of-flight mass analyzer, a multipole mass analyzer or an ion trap mass analyzer.

22. A mass spectrometry system, comprising:

an ion source for generating ions within a first space;

a first vacuum chamber which forms a second space, said first vacuum chamber comprising a gate electrode having an outlet opening and a wall having an inlet opening, wherein said ions generated by said ion source can be directed from said first space into said first vacuum chamber via said inlet opening;

said vacuum chamber being maintained at a lower pressure than said first space so that gas contained within said first space flows from said first space into said vacuum chamber when said inlet opening is unobstructed;

an ion reservoir disposed within said first vacuum chamber, wherein said ion reservoir is capable of maintaining ions within said first vacuum chamber;

an inlet shutter, wherein said inlet shutter can block said inlet opening to prevent said ions and said gas from entering said first vacuum chamber;

an outlet shutter, wherein said outlet shutter can block said outlet opening to prevent ions from exiting said first vacuum chamber;

a laser source in operative association with said first vacuum chamber; and a mass analyzer, wherein said mass analyzer is disposed within a second vacuum chamber.

23. The mass spectrometry system of claim 22, wherein said laser source comprises an infrared laser source.

24. The mass spectrometry system of claim 22, wherein said laser source dissociates at least a portion of said ions maintained within said first vacuum chamber to form fragment ions.

25. The mass spectrometry system of claim 22, wherein said laser source excites solvent in said first vacuum chamber to vaporize said solvent.

26. A method of processing ions, comprising:

providing a vacuum chamber comprising a gate electrode having an outlet opening and a wall having an inlet opening;

providing an ion reservoir within said vacuum chamber, wherein said ion reservoir is capable of maintaining ions within said vacuum chamber;

providing an inlet shutter, wherein said inlet shutter can block said inlet opening to prevent ions and non-ionized gas from entering said vacuum chamber;

providing an outlet shutter, wherein said outlet shutter can block said outlet opening to prevent ions from exiting said vacuum chamber;

generating ions within a first space;

opening said inlet shutter to allow ions to be directed from said first space into said vacuum chamber;

closing said inlet shutter to isolate said ions directed into said vacuum chamber from said first space;

maintaining ions in said vacuum chamber for a period of time; and opening said outlet shutter and altering an electrical potential of said gate electrode to release ions from said vacuum chamber.

27. The method of claim 26, wherein ions are continuously generated within said first space.

28. The method of claim 26, further comprising:

introducing a reactive moiety into said vacuum chamber for a time sufficient for at least some of said reactive moiety to react with at least some of said ions maintained within said vacuum chamber to form product ions; and releasing said product ions from said vacuum chamber.

29. The method of claim 28, wherein said reactive moiety comprises at least one of the following: gaseous molecules, gaseous ions and plasma.

30. The method of claim 28, wherein said reaction comprises an ion-molecule reaction and said reactive moiety comprises a gas phase deuterated solvent, gas phase acid, a gas phase base or reactive electrophile.

31. The method of claim 28, wherein said reactive moiety comprises a deuterated solvent selected from $D_2O$, $ND_3$ or $CH_3OD$.

32. The method of claim 28, wherein said reactive moiety comprises an acid selected from acetic acid, trifluoroacetic acid or hydroiodic acid.

33. The method of claim 28, wherein said reactive moiety comprises a base selected from ammonia, dimethylamine, trimethylamine, N,N,N',N'-tetramethyl-1,8-naphthalenediamine, tetramethyldiamine, imidazole, triethylamine and tripropylamin.

34. The method of claim 28, wherein said reaction comprises an ion-ion reaction and said reactive moiety comprises perfluoro-1,3-dimethylcyclohexane.

35. The method of claim 28, wherein said reactive moiety comprises at least one chemical isotope that is absent from the isotopic species that form the elemental building blocks of said generated ions.

36. The method of claim 35, wherein said chemical isotope is deuterium.

37. The method of claim 26, further comprising:

irradiating at least a portion of said ions maintained within said vacuum chamber to form fragment ions; and releasing said fragment ions from said vacuum chamber.

38. The method of claim 26, further comprising:

directing said ions released from said vacuum chamber to a mass analyzer.

39. The method of claim 38, wherein said mass analyzer comprises at least one of the following: a magnetic sector mass analyzer, a Fourier transform mass spectrometry mass analyzer, a time-of-flight mass analyzer, a multipole mass analyzer or an ion trap mass analyzer.

40. The method of claim 26, wherein said ions are generated by at least one of the following: an electron impact (EI) ionization source, an electrospray ionization (ESI) source, a chemical ionization (CI) source and a matrix-assisted laser desorption ionization (MALDI) source.

41. The method of claim 26, further comprising:

desolvating said ions maintained in said vacuum chamber.

42. The method of claim 26, wherein said generated ions are comprised of protein ions, peptide ions, oligonucleotide ions, nucleic acid ions, or carbohydrate ions.

43. The method of claim 26, wherein said generated ions are comprised of protein ions, peptide ions, oligonucleotide ions, nucleic acid ions, or carbohydrate ions and complexes of said protein ions, peptide ions, oligonucleotide ions, nucleic acid ions, or carbohydrate ions with other molecules that bind to said protein ions, peptide ions, oligonucleotide ions, nucleic acid ions, or carbohydrate ions.

44. The method of claim 26, wherein said ion reservoir comprises at least one of the following: a rf-multipole ion reservoir, an electrostatic lens ion reservoir and a jet expansion ion reservoir.

45. The method of claim 26, wherein said generated ions are generated from a compound obtained via an analytical separation technique.

46. The method of claim 45, wherein said analytical separation technique comprises high pressure liquid chromatography.

47. The method of claim 45, wherein said analytical separation technique comprises capillary electrophoresis chromatography.

48. The method of claim 45, wherein said analytical separation technique comprises capillary electrophoresis.

* * * * *

UNITED STATES PATENT AND TRADEMARK OFFICE

CERTIFICATE OF CORRECTION

PATENT NO. : 6,828,550 B2
DATED : December 7, 2004
INVENTOR(S) : Griffey et al.

It is certified that error appears in the above-identified patent and that said Letters Patent is hereby corrected as shown below:

Column 27,
Lines 60-61, replace "uressure" with -- pressure --

Signed and Sealed this

Seventeenth Day of May, 2005

JON W. DUDAS
*Director of the United States Patent and Trademark Office*